(12) United States Patent
Gärdenfors et al.

(10) Patent No.: US 10,873,619 B2
(45) Date of Patent: *Dec. 22, 2020

(54) SYSTEM AND METHOD FOR TRANSFERRING DATA BETWEEN ELECTRONIC DEVICES

(71) Applicant: BlackBerry Limited, Waterloo (CA)

(72) Inventors: Dan Zacharias Gärdenfors, Malmö (SE); Michael Erik Winberg, Malmö (SE); Emil Wasberger, Fandskrona (SE)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,816

(22) Filed: Mar. 18, 2019

(65) Prior Publication Data

US 2019/0215359 A1 Jul. 11, 2019

Related U.S. Application Data

(63) Continuation of application No. 14/927,564, filed on Oct. 30, 2015, now Pat. No. 10,237,330, which is a
(Continued)

(51) Int. Cl.
*H04W 76/00* (2018.01)
*H04L 29/08* (2006.01)
(Continued)

(52) U.S. Cl.
CPC ............ *H04L 67/06* (2013.01); *G06F 3/0482* (2013.01); *G06F 3/04842* (2013.01);
(Continued)

(58) Field of Classification Search
CPC ...... H04L 67/06; H04W 76/14; H04W 28/06; H04W 92/18; H04M 1/7253; H04M 2250/64; G06F 3/0482; G06F 3/04842
See application file for complete search history.

(56) References Cited

U.S. PATENT DOCUMENTS 741,200 A 10/1903 Weston
5,838,914 A 11/1998 Carleton et al.
(Continued)

FOREIGN PATENT DOCUMENTS

EP 186808 7/1986
EP 1271286 1/2003
(Continued)

OTHER PUBLICATIONS

International Search Report dated Jul. 12, 2013, in PCT application No. PCT/CA2013/050086.
(Continued)

*Primary Examiner* — Ping Y Hsieh
(74) *Attorney, Agent, or Firm* — Fish & Richardson P.C.

(57) ABSTRACT

A system and method are provided for transferring data from a first mobile device to another device by determining a set comprising one or more items, initiating a first transfer of at least some data associated with at least one of the one or more items to the other device, detecting an interaction with the set, and enabling a second transfer of additional data associated with the set.

36 Claims, 22 Drawing Sheets

Related U.S. Application Data continuation of application No. 13/401,593, filed on Feb. 21, 2012, now Pat. No. 9,197,733.

(51) Int. Cl.
*H04W 76/14* (2018.01)
*H04M 1/725* (2006.01)
*H04W 28/06* (2009.01)
*G06F 3/0482* (2013.01)
*G06F 3/0484* (2013.01)
*H04W 92/18* (2009.01)

(52) U.S. Cl.
CPC ......... *H04M 1/7253* (2013.01); *H04W 28/06* (2013.01); *H04W 76/14* (2018.02); *H04M 2250/64* (2013.01); *H04W 92/18* (2013.01)

(56) References Cited

U.S. PATENT DOCUMENTS

| | | | |
|---|---|---|---|
| 7,441,200 | B2 | 10/2008 | Savage |
| 7,511,682 | B2 | 3/2009 | Fuller et al. |
| 7,577,912 | B2 | 8/2009 | Govindan et al. |
| 7,634,780 | B2 | 12/2009 | Rhoten et al. |
| 7,865,468 | B2 | 1/2011 | Naineni |
| 9,197,733 | B2 * | 11/2015 | Gardenfors ......... H04M 1/7253 |
| 2003/0090517 | A1 | 5/2003 | Anderson et al. |
| 2004/0163046 | A1 | 8/2004 | Chu et al. |
| 2006/0001593 | A1 | 1/2006 | Baudisch |
| 2006/0010204 | A1 | 1/2006 | Jalava et al. |
| 2006/0088277 | A1 | 4/2006 | Lee |
| 2006/0154649 | A1 | 7/2006 | Pedersen et al. |
| 2006/0259866 | A1 | 11/2006 | Prasad et al. |
| 2007/0296643 | A1 | 12/2007 | Ben-Shachar et al. |
| 2008/0256468 | A1 | 10/2008 | Peters et al. |
| 2009/0029669 | A1 | 1/2009 | Levien et al. |
| 2009/0029690 | A1 | 1/2009 | Levien et al. |
| 2009/0055758 | A1 | 2/2009 | Sim et al. |
| 2009/0069911 | A1 | 3/2009 | Stefik |
| 2009/0125634 | A1 | 5/2009 | Virdi et al. |
| 2009/0193351 | A1 | 7/2009 | Lee et al. |
| 2009/0197635 | A1 | 8/2009 | Kim et al. |
| 2010/0060549 | A1 | 3/2010 | Tsern |
| 2010/0060572 | A1 | 3/2010 | Tsern |
| 2010/0064228 | A1 | 3/2010 | Tsern |
| 2010/0082567 | A1 | 4/2010 | Rosenblatt |
| 2010/0257239 | A1 | 10/2010 | Roberts |
| 2011/0025706 | A1 | 2/2011 | Etelapera |
| 2011/0040718 | A1 | 2/2011 | Tendjoukian et al. |
| 2011/0126231 | A1 | 5/2011 | Ko |
| 2011/0183654 | A1 | 7/2011 | Lanier et al. |
| 2011/0197147 | A1 | 8/2011 | Fair |
| 2011/0230178 | A1 | 9/2011 | Jones et al. |
| 2011/0252317 | A1 | 10/2011 | Keranen et al. |
| 2012/0046050 | A1 * | 2/2012 | Hymel .................. H04W 4/029 455/456.3 |
| 2013/0005256 | A1 | 1/2013 | Koehler |
| 2013/0073624 | A1 * | 3/2013 | Nguyen ........... H04N 21/23103 709/204 |
| 2013/0080573 | A1 | 3/2013 | Boliek et al. |
| 2013/0110992 | A1 * | 5/2013 | Ravindra .............. H04W 4/185 709/220 |

FOREIGN PATENT DOCUMENTS

| | | |
|---|---|---|
| EP | 1868078 | 12/2007 |
| EP | 2239921 | 10/2010 |
| EP | 2337300 | 6/2011 |
| EP | 2385689 | 11/2011 |
| WO | 2005071530 | 8/2005 |
| WO | 2006043977 | 4/2006 |

OTHER PUBLICATIONS

International Search Report dated Mar. 28, 2013, in corresponding PCT patent application No. PCT/CA2013/050132.

Extended European Search report dated Jul. 20, 2012 in corresponding European patent application No. 12156380.3.

Extended European Search eport dated Jun. 29, 2012, in corresponding European patent application No. EP12156344.

Air Display; httpp://avatron.com/apps/air-display; Avatron; retrieved online Oct. 15, 2011.

IDisplay for Android; http://www.shapeservices.com/en/products/details.php?product=idisplay&platform=android; retrieved online Oct. 15, 2011.

LiveView Press Release; httpp://www.sonyericsson.com/cws/companyandpress/pressreleases/pressrelease/pressreleaseoverview/liveviewpressreleasefinal-20100928?cc=gb@lc=en; Sep. 28, 2010; Sony Ericsson; retrieved online Oct. 15, 2011.

MaxiVista v4—Manual; http://www.maxivista.com/docs4/09/manual.htm; retrieved online Oct. 15, 2011.

PC Remote Controller—Android Market; https://market.android.com/details?id=com.silicmobile.pcremotecontroller&hl=en; retrieved online Oct. 15, 2011.

Gilliland, A.: Pixel Proliferation: A Toolset for Managing Screen Resolutsion | A PUnchcut Perspective; Apr. 1, 2011; httpp://punchcut.com/perspectives/expanding-universe-toolset-managing-screen-resolutions; retrieved online Feb. 23, 2012.

Murphy, M.: Handling Multiple Screen Sizes, Part Two; Feb. 18, 2020; http://www.androidguys.com/2010/02/18/handling-multiple-screen-sizes-part-2/; retrieved online Mar. 23, 2012.

Meskins, J: Tool Suport for Designing, Managing and Optimizing Multi-Device User Interfaces; PhD. Thesis, Abstract; 2011; Maastricht University. 2011.

Notice of Allowance dated Oct. 2, 2018 received for Canadian Patent Application No. 2,866,068.

Canadian Office Action dated Sep. 19, 2017, received for Canadian applicaiton No. 2866,068, dated Sep. 19, 2017.

International Search Report completed on Jul. 12, 2013; received for corresponding PCT Patent Application No. PCT/CA2013/050086.

Office Action dated Jul. 24, 2014, received for U.S. Appl. No. 13/401,593.

Office Action dated Mar. 3, 2014, received for U.S. Appl. No. 13/401,593.

Office Action dated Dec. 11, 2014, received for U.S. Appl. No. 13/401,593.

Office Action dated May 15, 2015, received for U.S. Appl. No. 13/401,593.

* cited by examiner

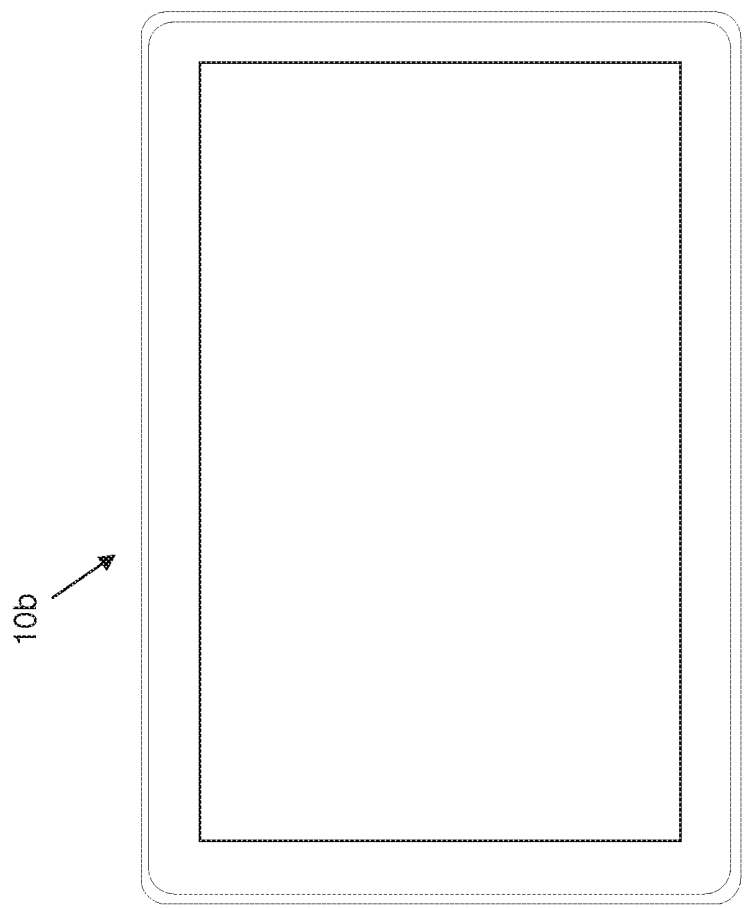
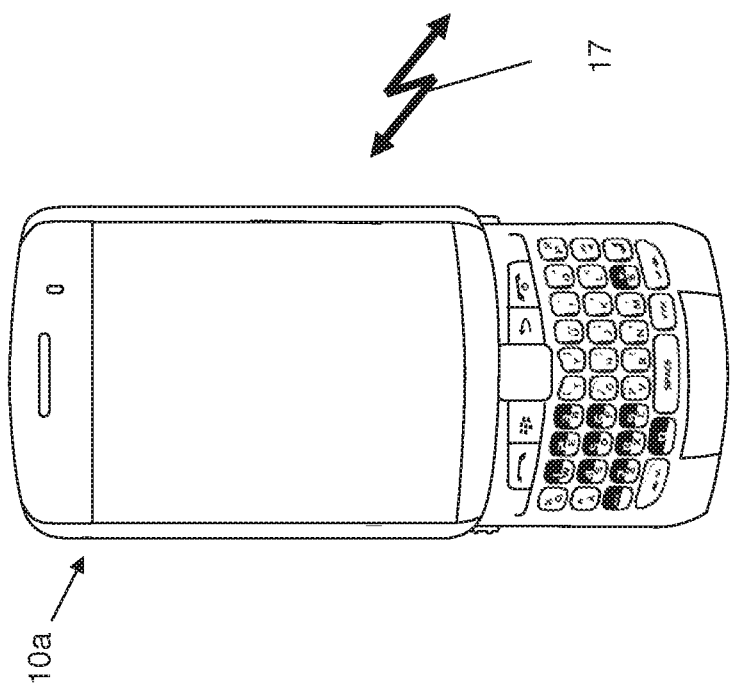
FIG. 2

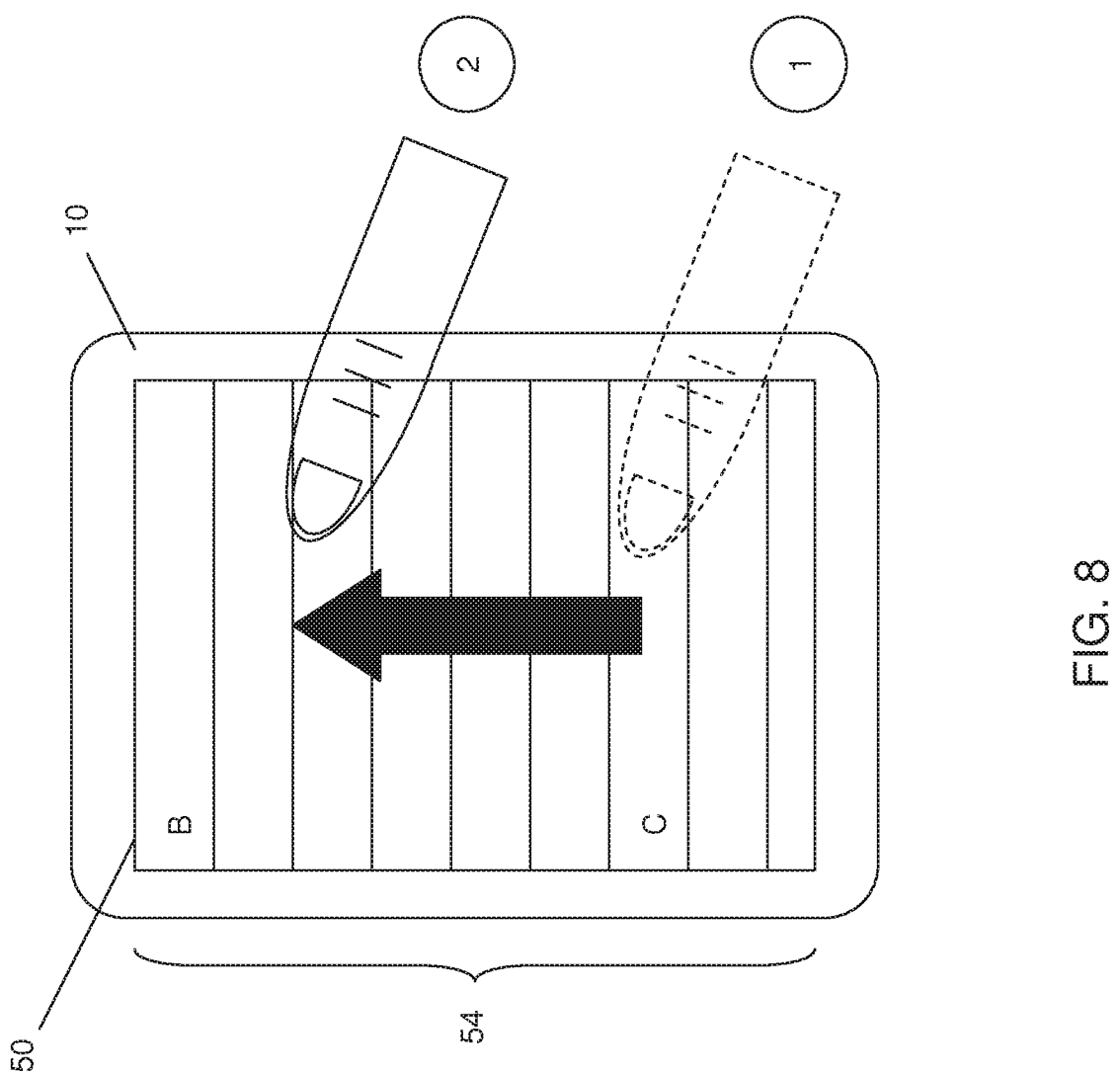

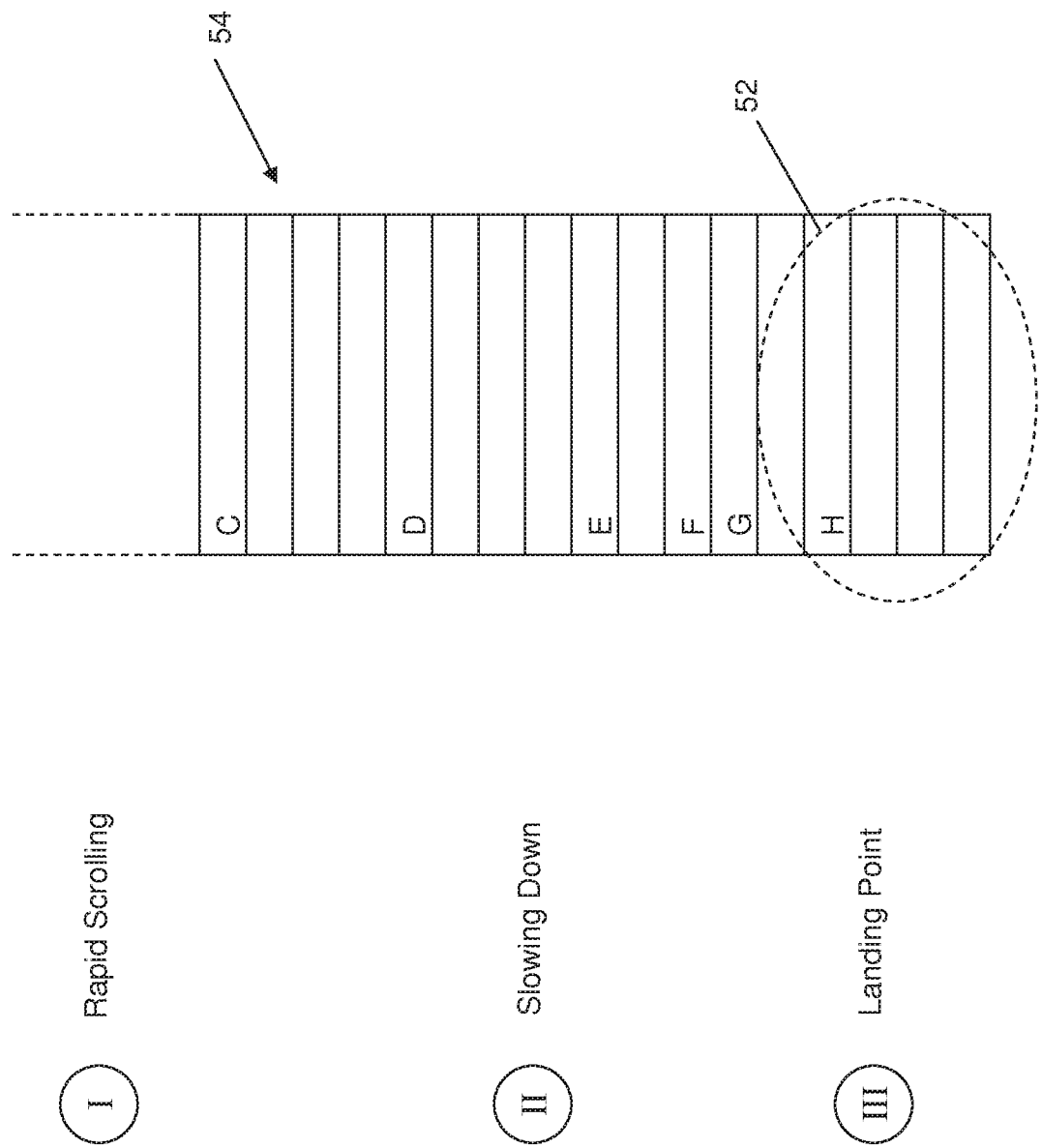

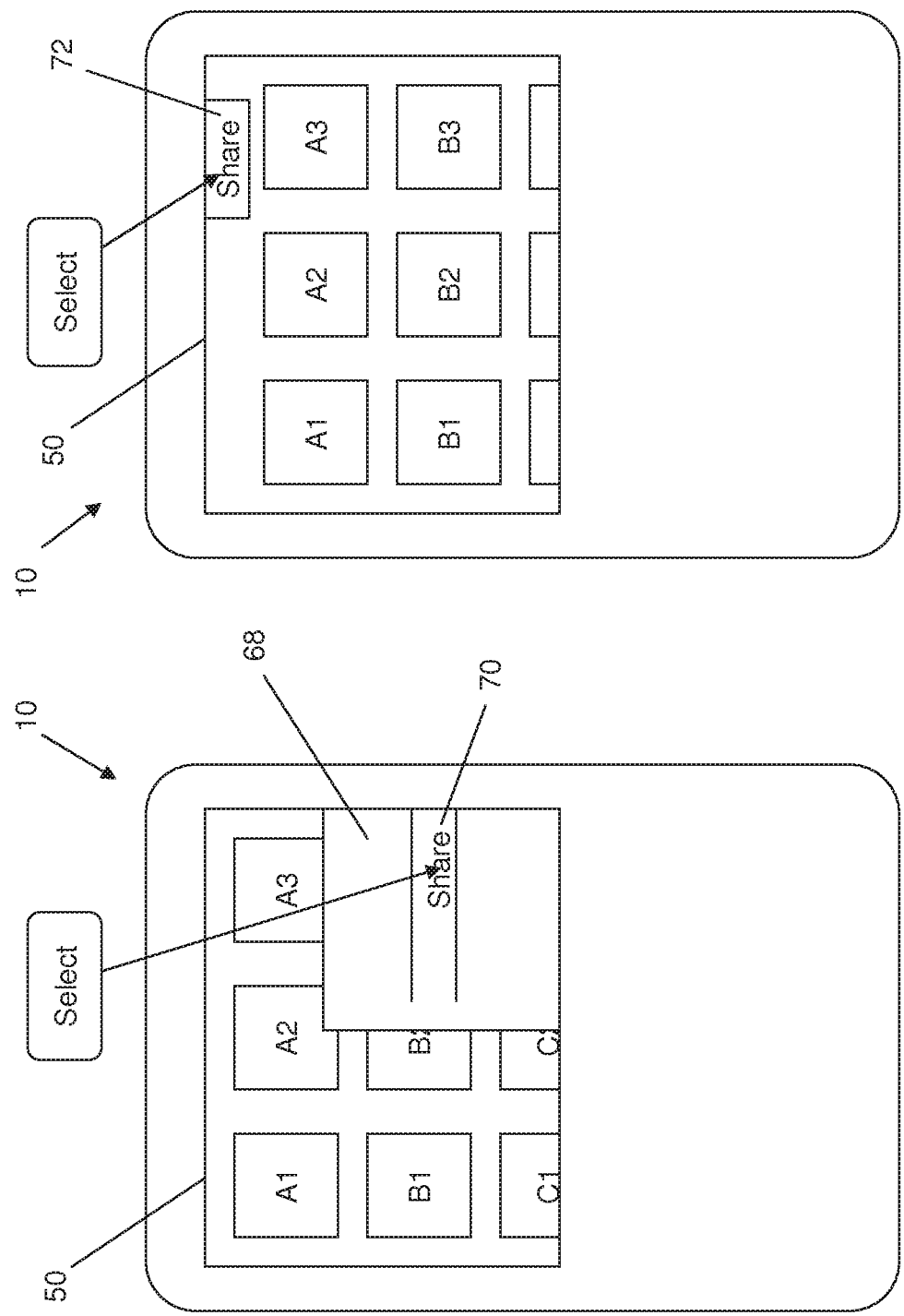

SYSTEM AND METHOD FOR TRANSFERRING DATA BETWEEN ELECTRONIC DEVICES

TECHNICAL FIELD

The following relates to systems and methods for transferring data between electronic devices.

DESCRIPTION OF THE RELATED ART

The various forms of connectivity available between electronic devices, particularly mobile or "handheld" electronic devices (mobile devices hereinafter), and the inherent portability and ubiquity of such devices, has made transferring and sharing data files and other items ever more convenient and desirable. For example, two friends may view photos stored on their respective devices and wish to share certain photos. Typically, in order to share the items immediately, this requires establishing a connection between the respective devices (e.g., via Bluetooth, Wi-Fi, etc.) or sending data from one device to the other using a communication medium such as email, instant messaging (IM), text messaging, etc.

In addition to the effort that may be required in connecting devices and the effort that may be required in determining a desirable way in which to transfer the files, file transfer speeds may be problematic. For example, moving images, audio files, video files, or large data files using a short-range connection such as Bluetooth can take several seconds or even minutes depending on the capabilities of the medium used and size of the file being transferred. Such delays can detract from the experience and can inhibit real-time sharing experiences and interactions.

BRIEF DESCRIPTION OF THE DRAWINGS

Embodiments will now be described by way of example only with reference to the appended drawings wherein:

FIG. 2 is an elevation view of a pair of tethered mobile devices;

FIG. 8 is a schematic diagram illustrating a flick scroll gesture for traversing a list of items;

FIG. 9 is a schematic diagram illustrating scrolling stages;

FIG. 15 is a schematic diagram illustrating a menu displayed on an originating mobile device and having an option for initiating sharing of data with other devices;

FIG. 16 is a schematic diagram illustrating a share button displayed on an originating mobile device for initiating sharing of data with other devices;

DETAILED DESCRIPTION

Figure 1:
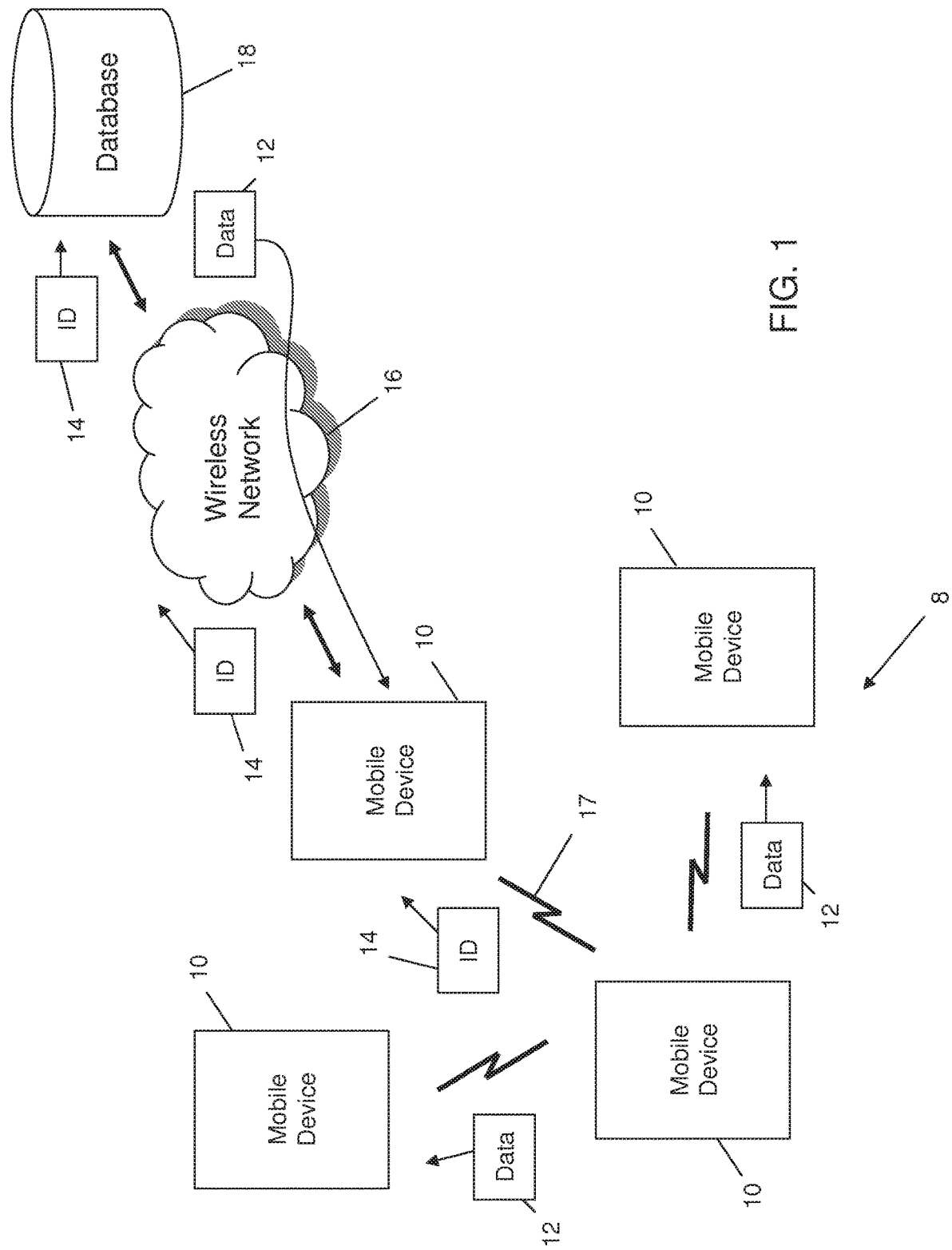
FIG. 1 is a block diagram schematically illustrating a communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

To address potential latency issues with respect to the transfer of data between electronic devices, the following describes a system and method that determines an appropriate time at which to begin transferring data that is likely to be shared and/or interacted with, to preemptively begin a file transfer before detecting an input to initiate the transfer.

By having at least some of the data transferred preemptively, the impression that the file transfer is immediate, instantaneous, or in real time can be achieved. Providing the appearance of a seamless transfer enables coordinated gestures such as chording where a file appears to be instantly transferred across devices when touching both devices in performing the gesture. Additionally, the ability to more conveniently transfer data between devices enables multiple devices to be used at the same time as if the multiple devices are behaving like a single device with multiple screens.

Turning now to FIG. 1, an example of a communication system 8 is shown. The communication system 8 in this example includes a number of mobile devices 10 that are configured to communication with each other via short-range communication connections 17, e.g., Bluetooth, Wi-Fi, infrared, etc. In this way, any one of the mobile devices 10 may transfer data 12 to others of the mobile devices 10 over the short-range communication connections 17 in order to share such data 12. As also shown in FIG. 1, in some examples, the initiating mobile device 10 may instead send an identifier (ID) 14 such as a pointer, link, or other information the enables a recipient mobile device 10 to obtain the data 12 from a source other than the initiating mobile device 10. In this example, the recipient mobile device 10 receiving an ID 14 uses the ID 14 to request, download, or otherwise obtain the data from a database 18 connectable to the mobile device 10 via a wireless network 16. The database 18 in FIG. 1 generally represents any data storage device or any entity including a data storage device that is capable of storing data 12 that is being referenced using the ID 14. For example, the database 18 may be a web-based service such as a "cloud" based system or service. It can be appreciated that the mobile devices 10 may also share data over other communication connections, including available connections via the wireless network 16, etc. It can also be appreciated that the mobile devices 10 may be in a same physical location or may be remote from each other.

The mobile devices 10 sharing data 12 and/or utilizing an ID 14 to have others obtain or download data 12 may be mobile devices 10 operated by a plurality of users, or a plurality of mobile devices 10 may be used at the same time by the same user. For example, as shown in FIG. 2, the same user may have a smart-phone 10a tethered to a tablet computer 10b over a short-range communication connection 17. As discussed below, the ability to more efficiently and seamlessly transfer data 12 between mobile devices 10 enables a single user to operate multiple devices in the same way as a single device having multiple screens thus enhancing the interactivity with such mobile devices 10 and the productivity that may be achieved accordingly.

Figure 3:
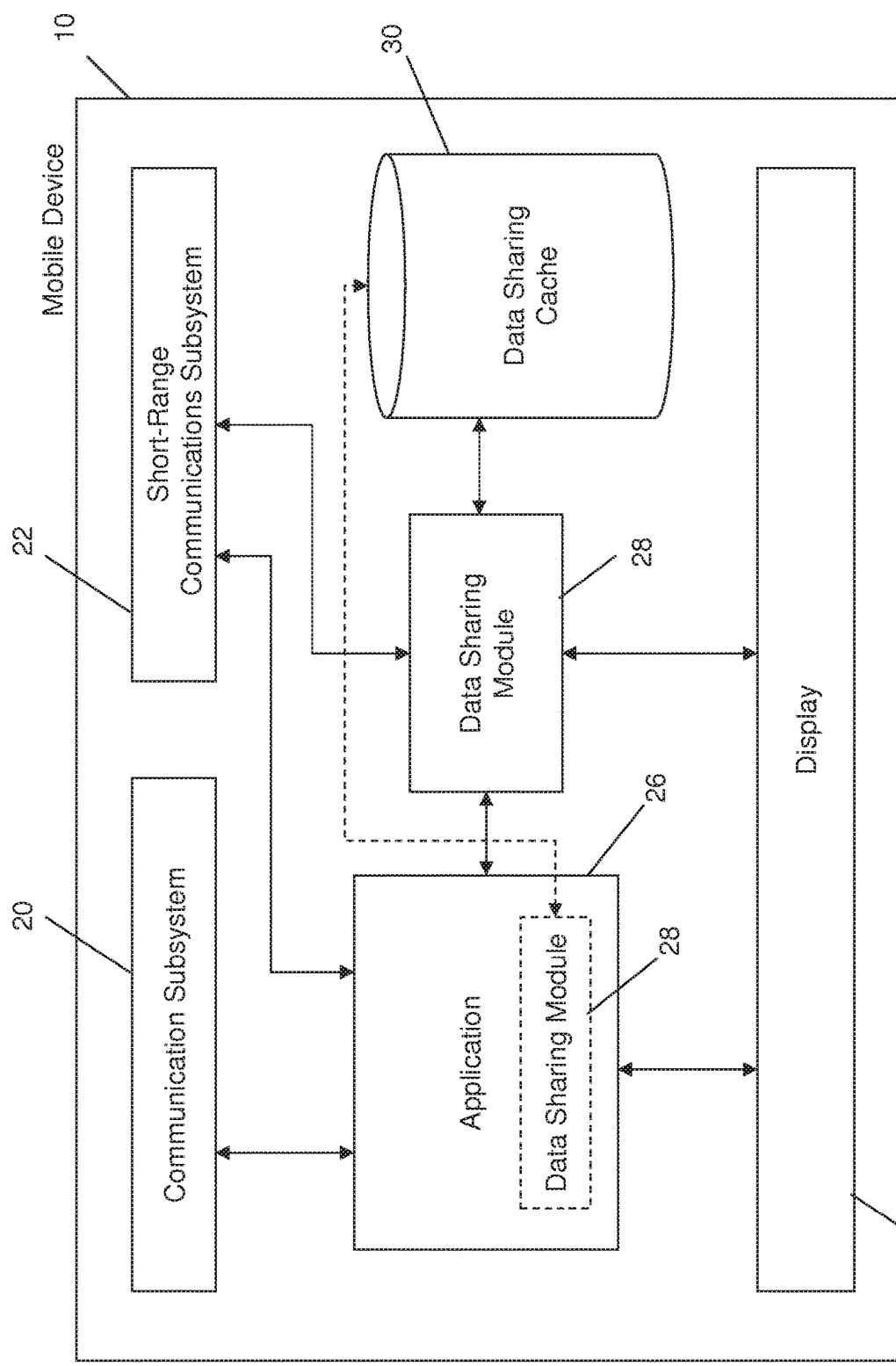
FIG. 3 is a block diagram schematically illustrating a configuration for a mobile device.

FIG. 3 illustrates an example of a configuration for a mobile device 10. The mobile device 10 in this example includes a communication subsystem 20 for accessing and exchanging data via a wireless network 12, and a short-range communications subsystem 22 for communicating with, for example, other mobile devices 10 via short-range communication connections 17 as shown in FIG. 1. The mobile device 10 also includes a display module 24 for rendering user interface elements on a display of the mobile device 10. In the example shown in FIG. 3, an application 26 may include a data sharing module 28 for initiating and coordinating the transfer of data 12 and/or IDs 14 to other mobile devices 10, or the data sharing module 28 may be a separate component, e.g., in order to enable the data sharing module 28 to be used or accessed by a plurality of applications 26. The data sharing module 28 includes or otherwise has access to a data sharing cache 30.

It can be appreciated that the configuration shown in FIG. 3 may be suitable for both initiating mobile devices 10 and recipient mobile devices 10 and thus includes components that may or may not be needed in order to perform the operations required by either type of mobile device 10. For example, a recipient mobile device 10 may utilize a data sharing cache 30 in order to cache data 12 that has been provided by an initiating mobile device 10 and/or a remotely located database 18, whereas a mobile device 10 configured only to be an initiating device may have the data 12 being shared saved in a different manner, e.g., using a media card (not shown). As such, the configuration shown in FIG. 3 is for illustrative purposes only.

In order to provide a more seamless data transfer experience, it has been recognized that by identifying a suitable opportunity to transfer at least some initial data 12 to other devices enables an initiating mobile device 10 to preemptively begin a data transfer operation before the data is to be used or manipulated on the recipient device(s). As will be discussed below and shown in FIG. 21, it can be appreciated that although many of the following example illustrate data sharing between mobile devices 10, the principles equally apply to sharing data with any device, including "non-mobile" devices.

Figure 4:
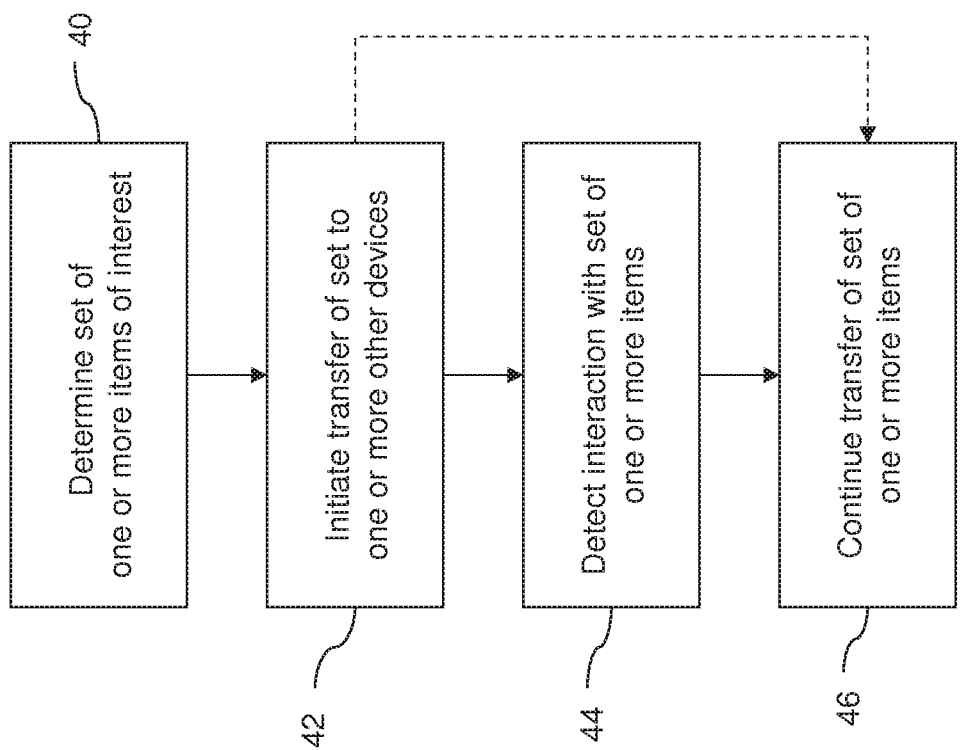
FIG. 4 is a flow chart illustrating example computer executable operations that may be performed in transfer items from one device to another device.

FIG. 4 illustrates a set of computer executable operations that may be performed in transfer data 12 from an initiating mobile device 10 to another device. At 40, the mobile device 10 determines a set of one or more items of interest that are likely to or otherwise have an increased chance of being shared. Determining which items constitute the set can be performed in various ways including identifying only those items currently viewable on a display of the mobile device 10, an item or items having a focus (e.g. eye-gaze, indicated via a voice command, etc.), or any other suitable predictive technique. For example, the items to be shared may be determined based on the nature of the relationship of the user of the initiating mobile device 10 and the recipient mobile device 10, relationships such as friendship, business, family, etc. In this way, when multiple types of items are displayed at the same time on the mobile device 10, only those that appear to be relevant to the user of the recipient mobile device 10 may be transferred. For example, if a folder of multiple documents is currently being viewed and some are tagged as personal, the personal items may not be transferred if the user of the recipient mobile device 10 is deemed to be a co-worker.

Once the items of interest are determined at 40, the data sharing module 28 may then initiate the transfer to one or more other devices at 42. The initial transfer may begin a full transfer or provide reduced or compressed data to enable the other devices to see the items such that by the time an interaction is made the transfer has progressed thus minimizing the appearance of a delay. For example, if the items being transferred are images, thumbnails of the images may be initially sent at 42 such that on the other device(s) the thumbnail images can be viewed, moved, copied, etc. In this way, the users of other devices can be given the impression that the sharing of data 12 is substantially instantaneous while the bulk of the transfer may take place later. The data sharing module 28 can be configured to determine, based on the application 26 being used to share data, the nature of the data 12, and the way in which the data 12 is to be used by the other device(s), how much data 12 is transferred initially and how the remaining data should be sent. For example, audio, video, or other temporal files may be streamed to the other devices and data 12 cached by the recipient device with the stream rate increased when a particular one of the audio or video files is opened and played. In the example shown in FIG. 4, after detecting an interaction with the items being transferred at 44, the data sharing module 28 may then continue the transfer of the items in the set, which may include allowing the transfer to continue or initiating a second phase of the transfer, e.g., sending a full image subsequent to sending a thumbnail image.

Figure 5:
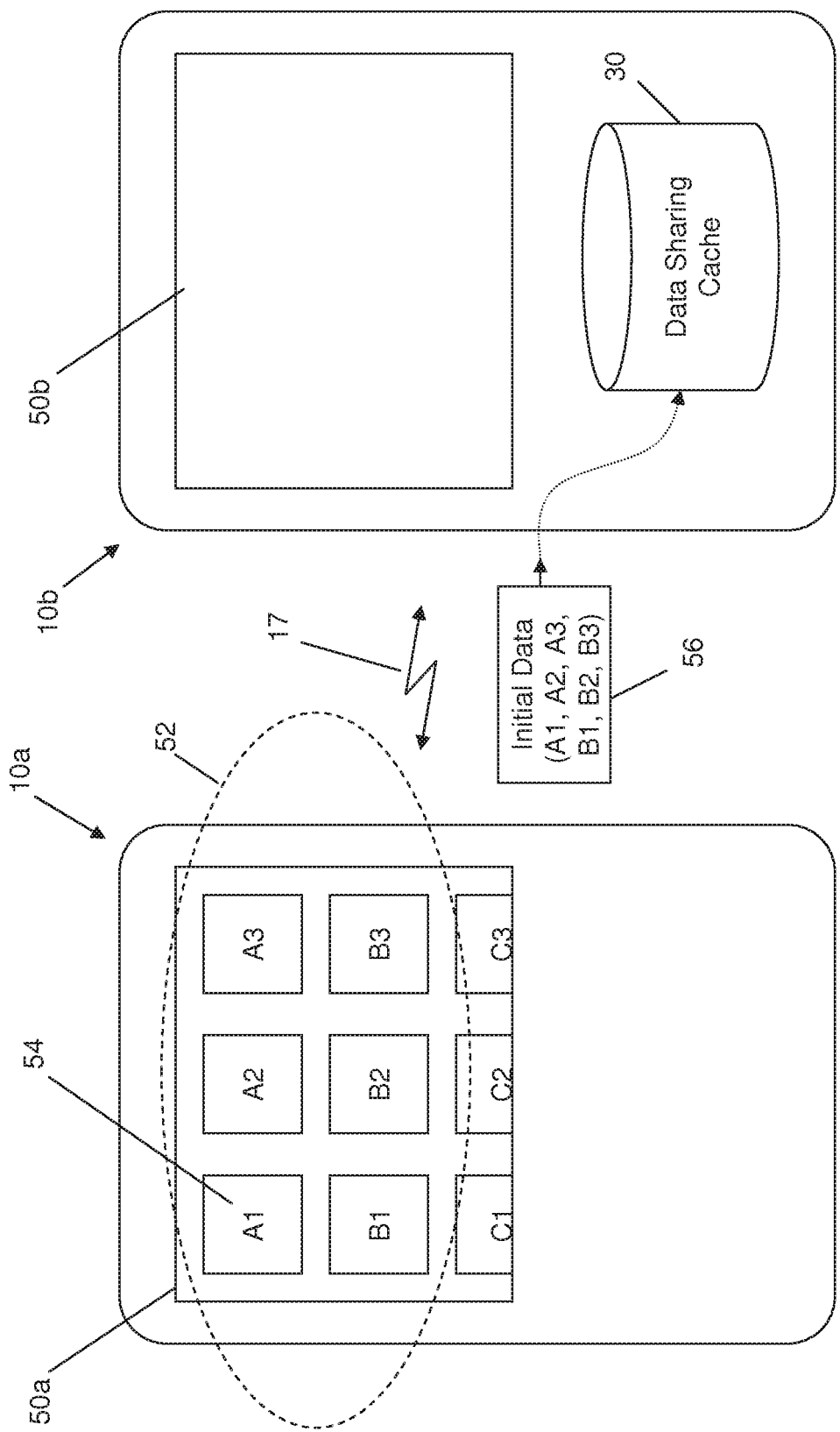
FIG. 5 is a schematic diagram illustrating an initial data transfer between devices.
Figure 6:
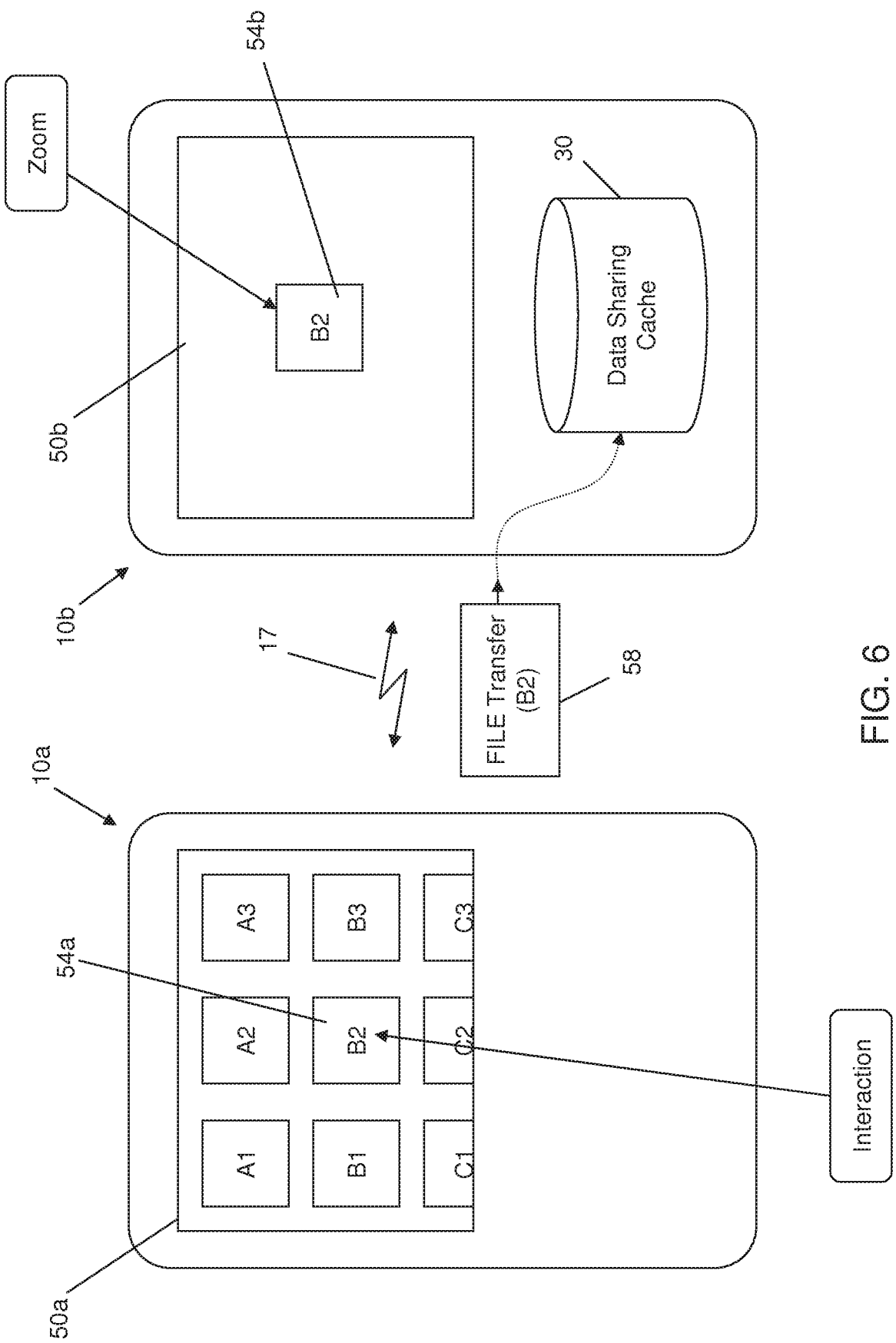
FIG. 6 is a schematic diagram illustrating commencement of a data file transfer between devices.
Figure 7:
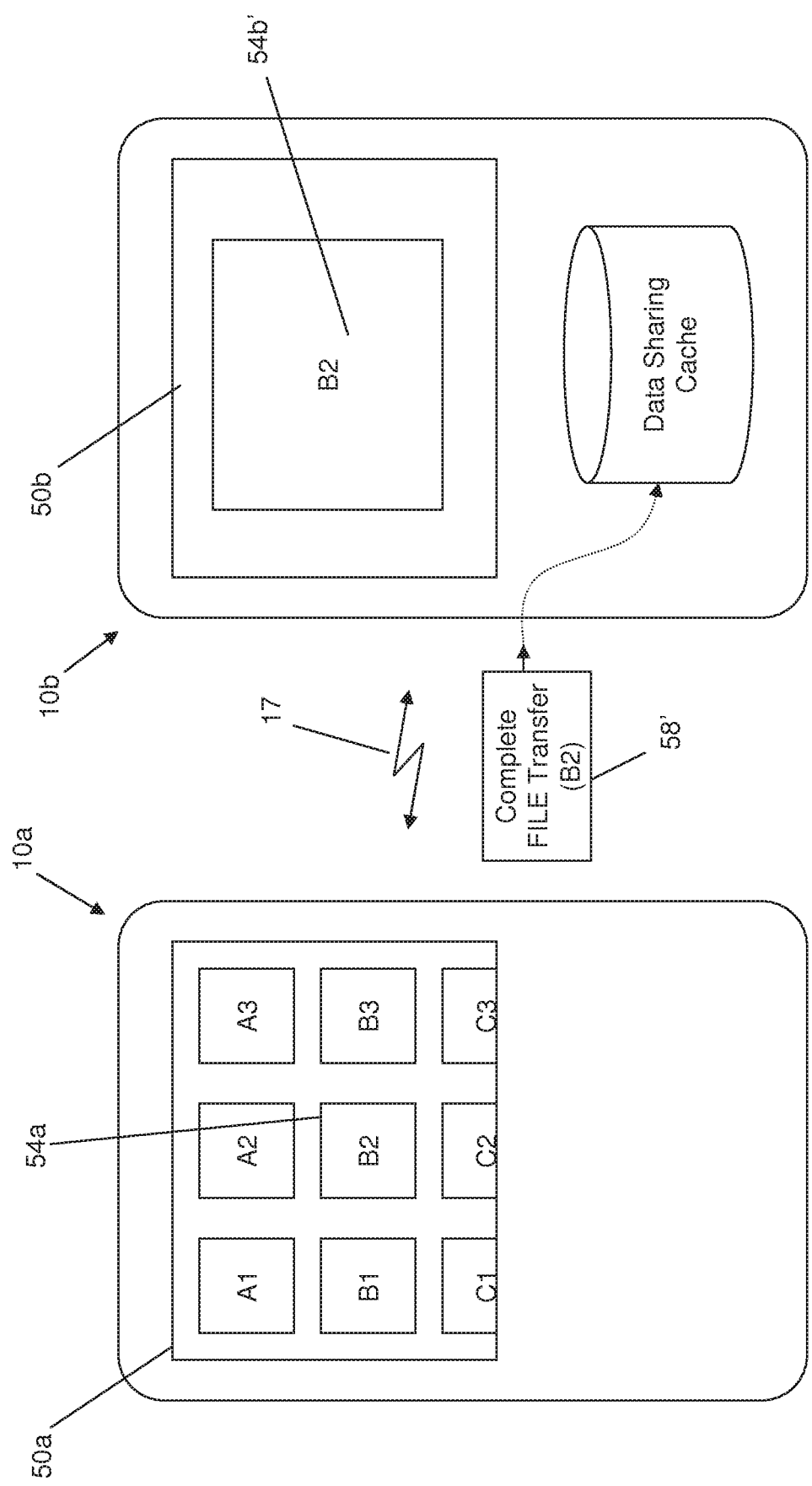
FIG. 7 is a schematic diagram illustrating completion of a data file transfer between devices and an interaction with a data file on a recipient device.

An example of a transfer is shown in FIGS. 5 through 7. In FIG. 5, a set 52 of items 54 is determined based on which items 54 can be fully seen on the display 50*a* of a first mobile device 10*a*. Initial data 56 is then sent based on the current set 52. In this example, the current set 52 includes items A1, A2, A3, B1, B2, and B3. A second mobile device 10*b* may then receive the initial data 56 and save the initial data 56 to a data sharing cache 30 such that the initial data 56 is available for subsequent transfers of the complete data and/or to enable applications 26 to interact with (e.g., display) the initial data 56.

As shown in FIG. 6, an interaction may be detected with a item B2 54*a*. For example, a user of the first mobile device 50*a* may indicate the they wish to discuss item B2 54*a*, may gaze at item B2 54*a*, may refer to item B2 54*a* using a voice command, etc. In the example shown in FIG. 6, it is assumed that a user of the first mobile device 10*a* instructs a user of the second mobile device 10*b* to take a closer look at item B2 54*a*. It is also assumed in this example that either through the interaction or prior to, the initial data associated with item B2, i.e., initial item 54*b* is viewable on a display 50*b* of the second mobile device 10*b*. The interaction may thus be used to trigger further data transfer 58 with respect to item 52 54*a* such that the second mobile device 10*b* is capable of, for example, performing a "zoom" operation on the displayed initial item 54*b* as if the entire file had been immediately and instantaneously available on the second mobile device 10*b*. It can be appreciated that the same principles apply to examples wherein the first and second mobile devices 10*a*, 10*b* are being operated by the same user.

FIG. 7 illustrates that the further data transfer 58 may continue until a complete file transfer 58' is performed, even during an operation or interaction with the item B2 54*b*' on the display 10*b*, e.g., if the data 12 can be transferred in stages as the zoom operation occurs. It can be appreciated that the file transfer stages 56, 58, and 58' shown in FIGS. 5-7 are for illustrative purposes only. For example, in scenarios wherein audio or video files are being shared, the initial transfer may begin streaming all of the audio or video files in the set 52 and such streaming may continuing until an interaction is detected. Once an interaction is detected, the data sharing module 28 may then pause the streaming of those items 54 not interacted with and continue streaming the item 54 that has been interacted with in order to increase the speed at which that item 54 is transferred.

It can be appreciated that a set 52 of items 54 to be transferred can be determined in various ways and the example shown in FIGS. 5 to 7 is for illustrative purposes only. For example, other ways to determine the set 52 that should be prioritized for an initial transfer include, without limitation, items 54 that are displayed on the display 50 longer than a predetermined amount of time when connected to another device, items 54 that have been opened or interacted with frequently or recently, items 54 that are currently being observed or about to be interacted with (e.g., using camera(s) and/or proximity sensors), and items 54 that are predicatively calculated to be displayed at the end of a scrolling list. The items 54 that are selected to be transferred in advance may be chosen for various reasons, including that those items 54 may be more likely to be considered for sharing at that time.

FIGS. 8 and 9 illustrate an example wherein a list of items 54 on a touch-sensitive display 50 of a mobile device 10, which items 54 are categorized alphabetically, is interacted with using a swipe or "flick" gesture causing a rapid scrolling movement through the list of items 54. In the example shown in FIG. 8, an upward movement of a finger in contact with the display 50 between points 1 and 2 causes a scrolling visualized schematically in FIG. 9. As shown in FIG. 9, stage I includes a rapid scrolling through the list of items 54, which slows down during stage II and finally stops at a "landing" point in stage III wherein a set 52 of the items is to be displayed on the display 50.

It can be appreciated that the nature of the scrolling gesture and the expected landing point can be pre-calculated by detecting a touch input and computing an extent to which the list of items 54 will scroll based on, for example, a detected force. By knowing the length of the list of items 54, the mobile device 10 can determine or predict or otherwise estimate which of the items 54 are likely to be viewable when the scrolling operation ends. By knowing which of the items 54 are likely to be included in a viewable set 52, those items 54 can be pre-cached during the scrolling gesture to further facilitate the seamless sharing of items 54. In the example shown in FIG. 9, the mobile device 10 may determine that items 54 categorized under "H" will be visible on the display 50 and begin transferring data associated with those items 54 after detecting the touch input at point 2 shown in FIG. 8.

Figure 11:
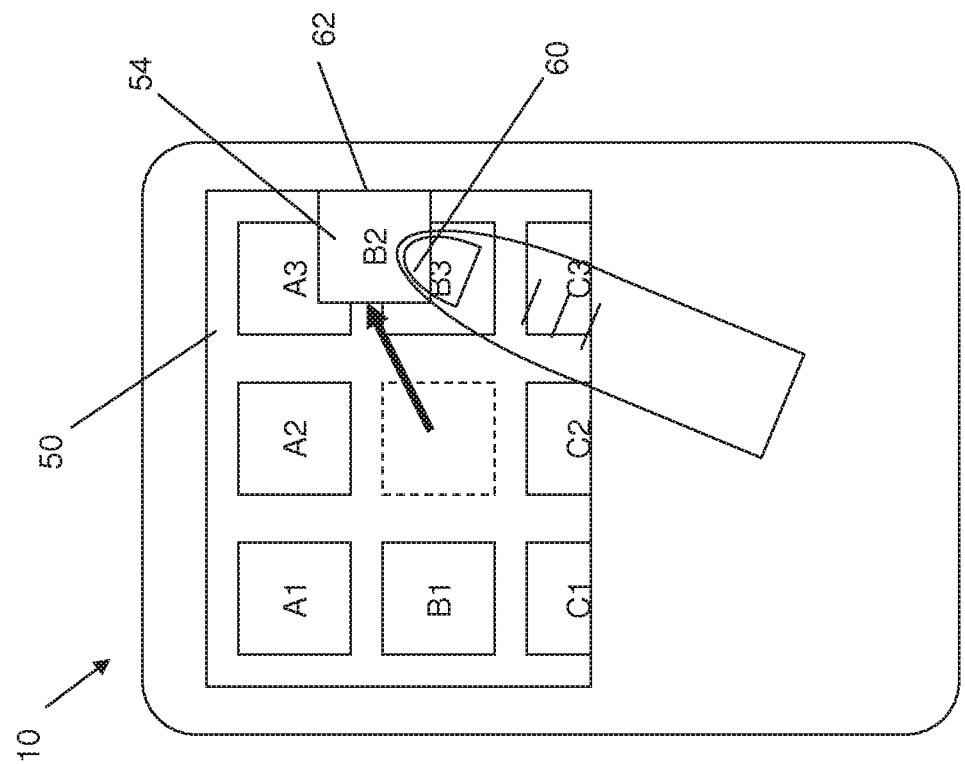
FIG. 11 is a schematic diagram illustrating completion of the interaction with an item shown in FIG. 8.
Figure 10:
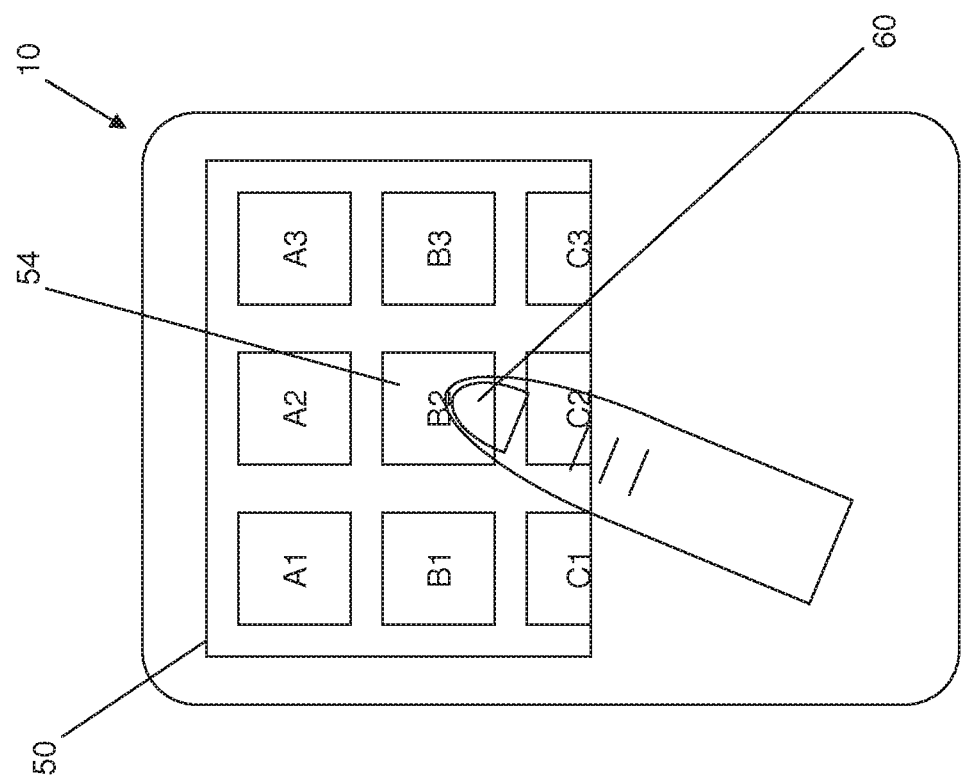
FIG. 10 is a schematic diagram illustrating initiation of an interaction with an item being displayed on a originating mobile device.

An example of an interaction that may trigger a full file transfer is shown in FIGS. 10 and 11. Turning now to FIG. 10, it can be assumed in this example that initial data 56 has been transferred to one or more other mobile devices or is in the process of being transferred. To shared a particular item 54, item B2 in this example, the user may deliberately cause the initiation of a full transfer by performing a gesture with respect to the item 54. For example, as shown in FIG. 11, item B2 may be swiped towards an edge 62 of the display 50 of the mobile device 10 in order to begin the transfer. This would allow the user of the mobile device 10 to say: "Take a look at this photo" and proceed to swipe the photo towards the other user(s) to then have the respective devices display at least the initial data for that item 54. The technique shown in FIGS. 10 and 11 may also be advantageously used in scenarios such as that shown in FIG. 2 wherein the same user is operating multiple devices in concert (e.g., via a tethering thereof). In this way, by simply swiping a desired item 54 towards the other device, that item 54 can appear to be instantaneously dropped into a display area on the other device.

Figure 12:
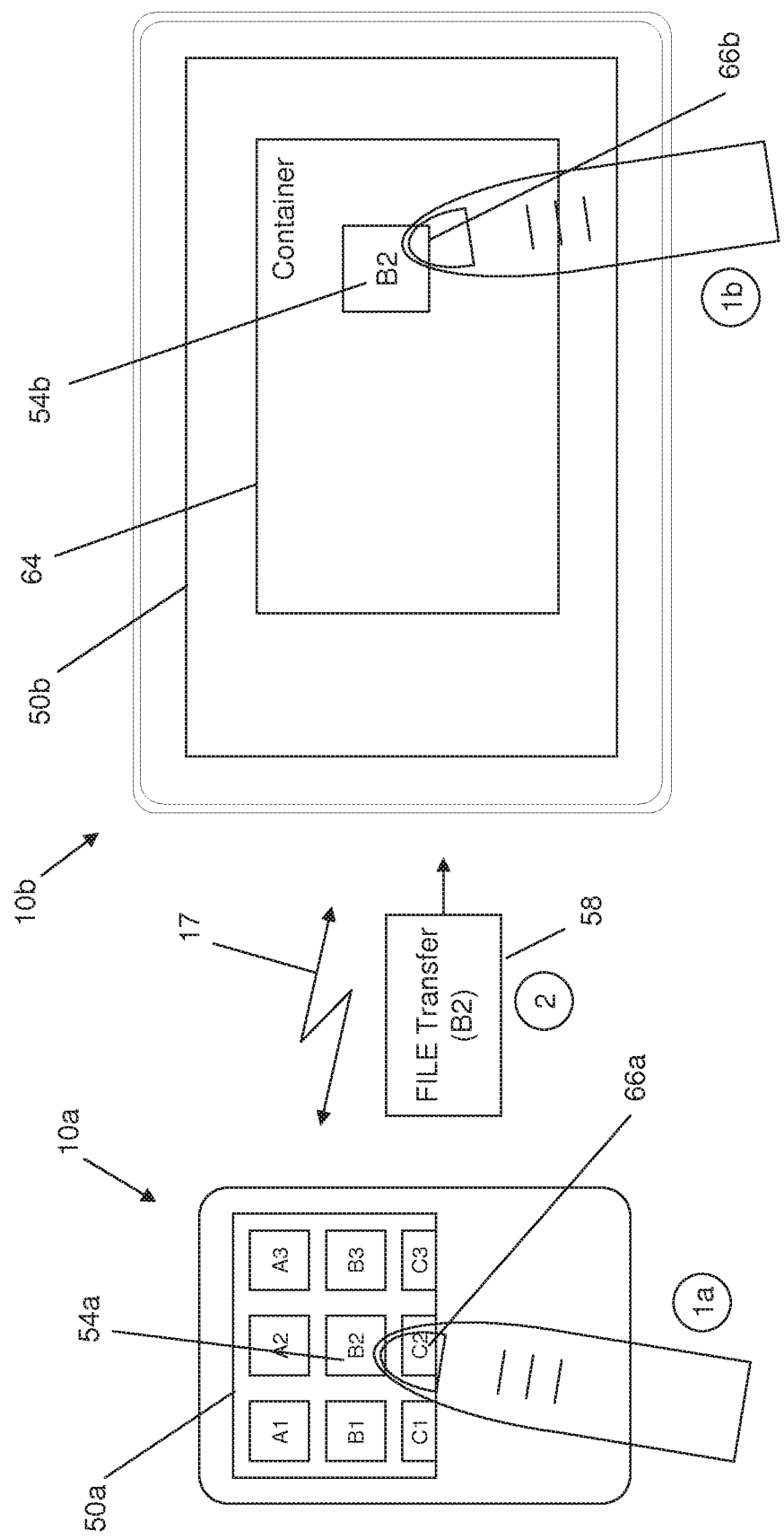
FIG. 12 is a schematic diagram illustrating initiation of a chording operation between a pair of mobile devices.

Similarly, as shown in FIG. 12, a chording gesture may be performed when at least some of the data 12 associated with the desired item 54 has already been transferred. In the example shown in FIG. 12, item B2 can be tapped on the first mobile device 10*a* and a "landing point" tapped on the second mobile device 10*b* at stages 1*a* and 1*b* respectively, to appear as an instantaneous operation. The complete file transfer 58 may then be initiated or continue at stage 2.

In the example shown in FIG. 12, a container 64, e.g., a presentation document, word processing document, spreadsheet, etc.; displayed on the second mobile device 10*b* may be operable to receive an item 54 tapped on the first mobile device 10*a* in concert with a location being indicated within the container 64 to perform a chording gesture.

Figure 13:
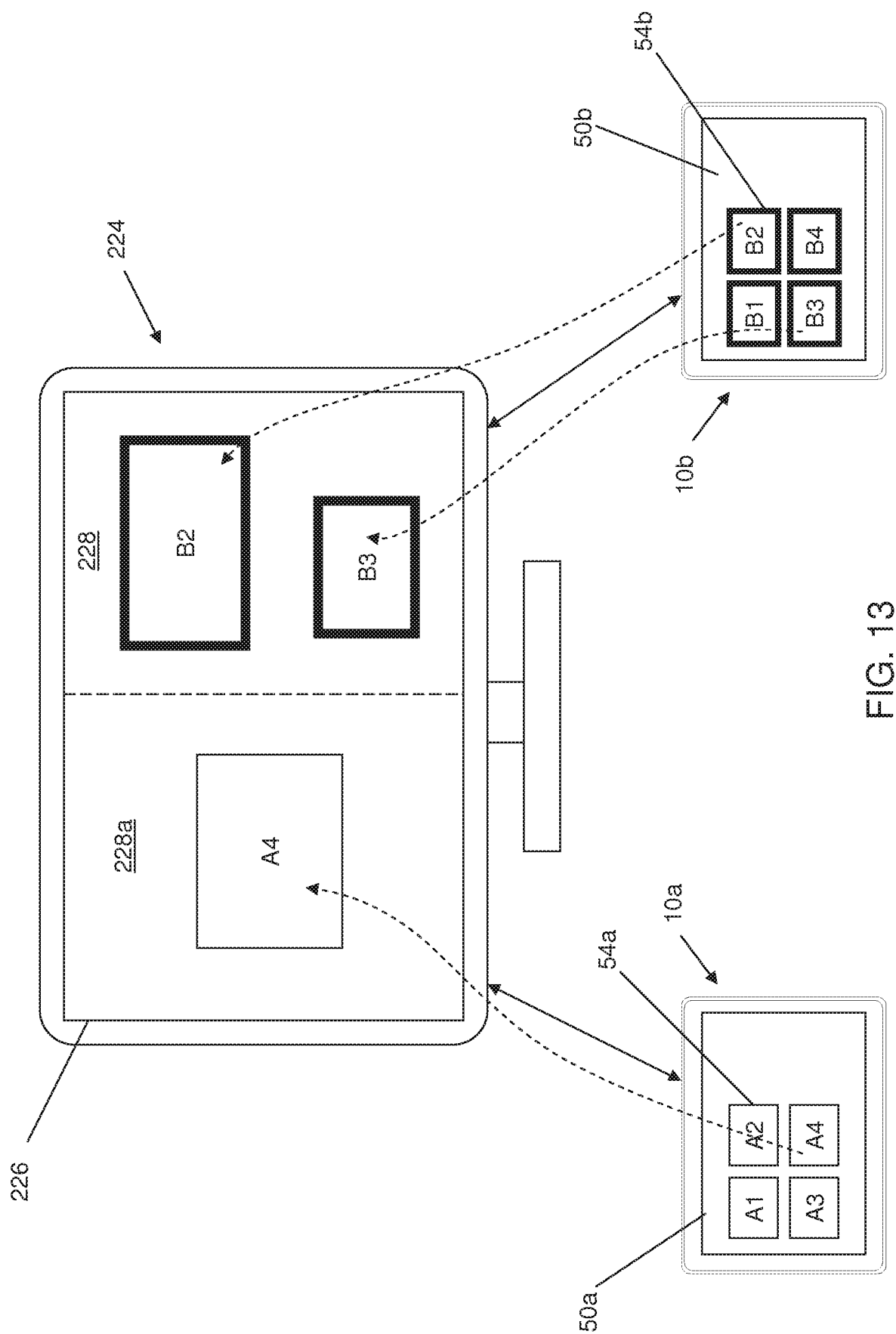
FIG. 13 is a schematic diagram illustrating sharing items from first and second devices using a third device.
Figure 14:
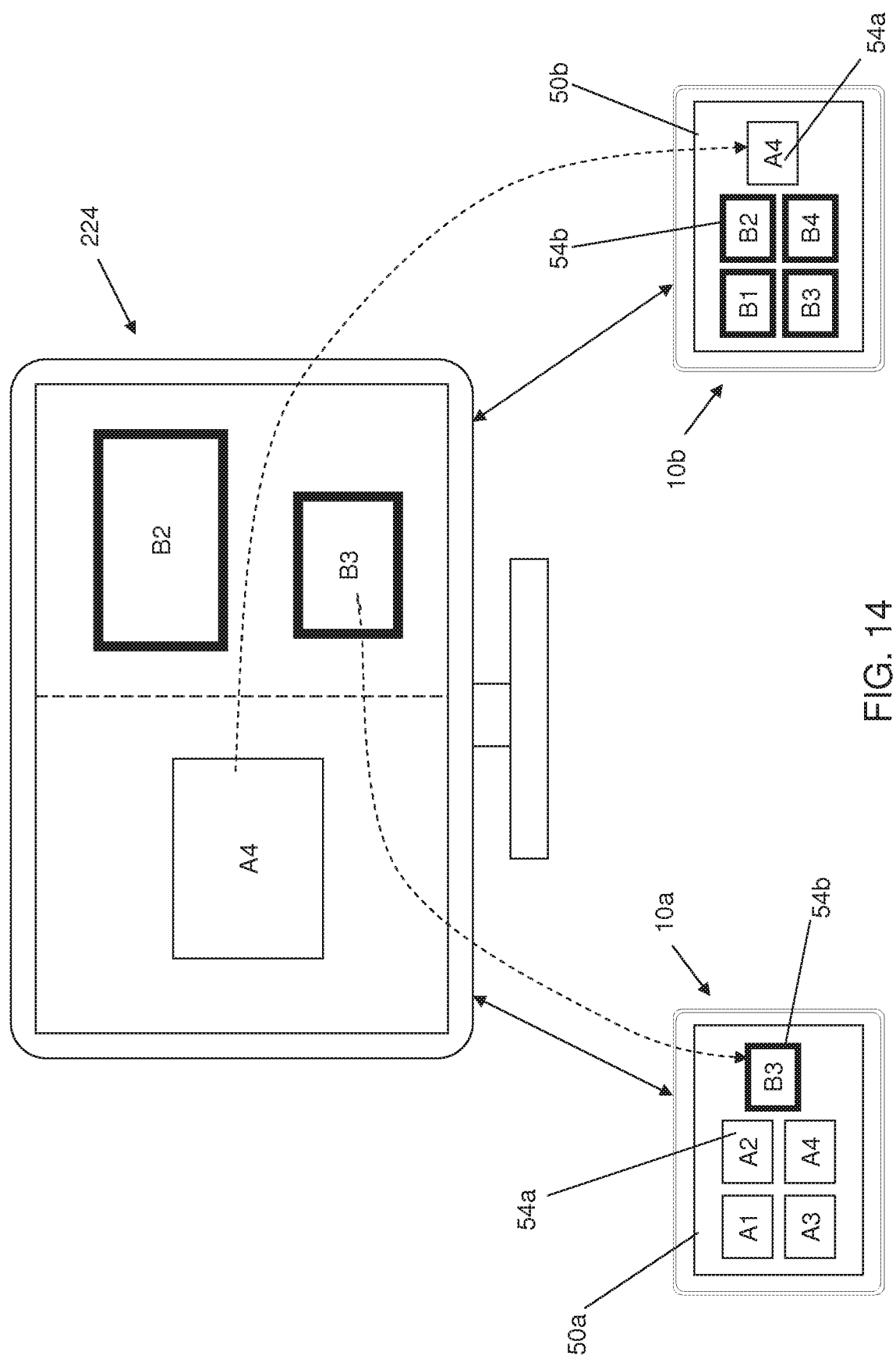
FIG. 14 is a schematic diagram illustrating transferring items between first and second devices using a third device.

FIGS. 13 and 14 illustrate another sharing scenario, in which first mobile device 10*a* and a second mobile device 10*b* share items 54*a* and 54*b* respectively with each other using an intermediate device 224. In the example shown in FIGS. 13 and 14, the intermediate device 224 includes a television having a relatively large screen 226 to facilitate the sharing experience. By enabling the first and second mobile device 10*a*, 10*b* to communicate with the television 224, a shared space can be created on a neutral, public or common device. The shared space provides an intermediate landing point for items 54 which the respective users wish to share whereby each user can select which items 54 to ultimately transfer from the shared space to their device or initiate a transfer from device-to-device.

As shown in FIG. 13, the screen 226 may be divided into a first device portion 228*a* and a second device portion 228*b* such that those items 54*a* shared by the first mobile device 10*a* are displayed in the first device portion 228*a* and the items 54*b* shared by the second mobile device 10*b* are displayed in the second device portion 228*b* to delineate the shared space. It can be appreciated that dividing the screen 226 is only one way in which to differentiate between content contributed by the first and second devices 10*a*, 10*b*. For example, the edges (e.g., borders) or corners of each item 54 could be color coded to distinguish between contributors. Similarly, each item 54 may be displayed with a profile picture thumbnail, name, or other identifier in associated therewith.

FIG. 14 illustrates that a second device item 54*b* can be transferred to the first mobile device 10*a* after being displayed on the television 224, and a first device item 54*a* can similarly be transferred to the second mobile device 10*b*. It can be appreciated that the same principles discussed above for determining which items 54 to preemptively transfer to the intermediate device 224 may also apply.

The data sharing module 28 can be operable to begin sharing data 12 automatically with those other devices within range of the mobile device 10 or otherwise connectable thereto, or may rely on detection of an input from a user. For example, as shown in FIG. 15, a menu 68 may be invoked having a share option 70. By selecting the share option 70 the data sharing module 68 may be invoked, triggered or otherwise turned on to begin connecting to other devices and performing initial data transfers. Another example is shown in FIG. 16 wherein a share button 72 or other user interface element is provided on the display 50 of the mobile device 10 along with the items 54 that may be transferred. The user interface elements shown in FIGS. 15 and 16 may therefore be provided to enable the user to decide when to begin sharing, e.g. when within the vicinity of a group of friends or after a discussion regarding the sharing of data 12 begins.

Figures 17, 18:
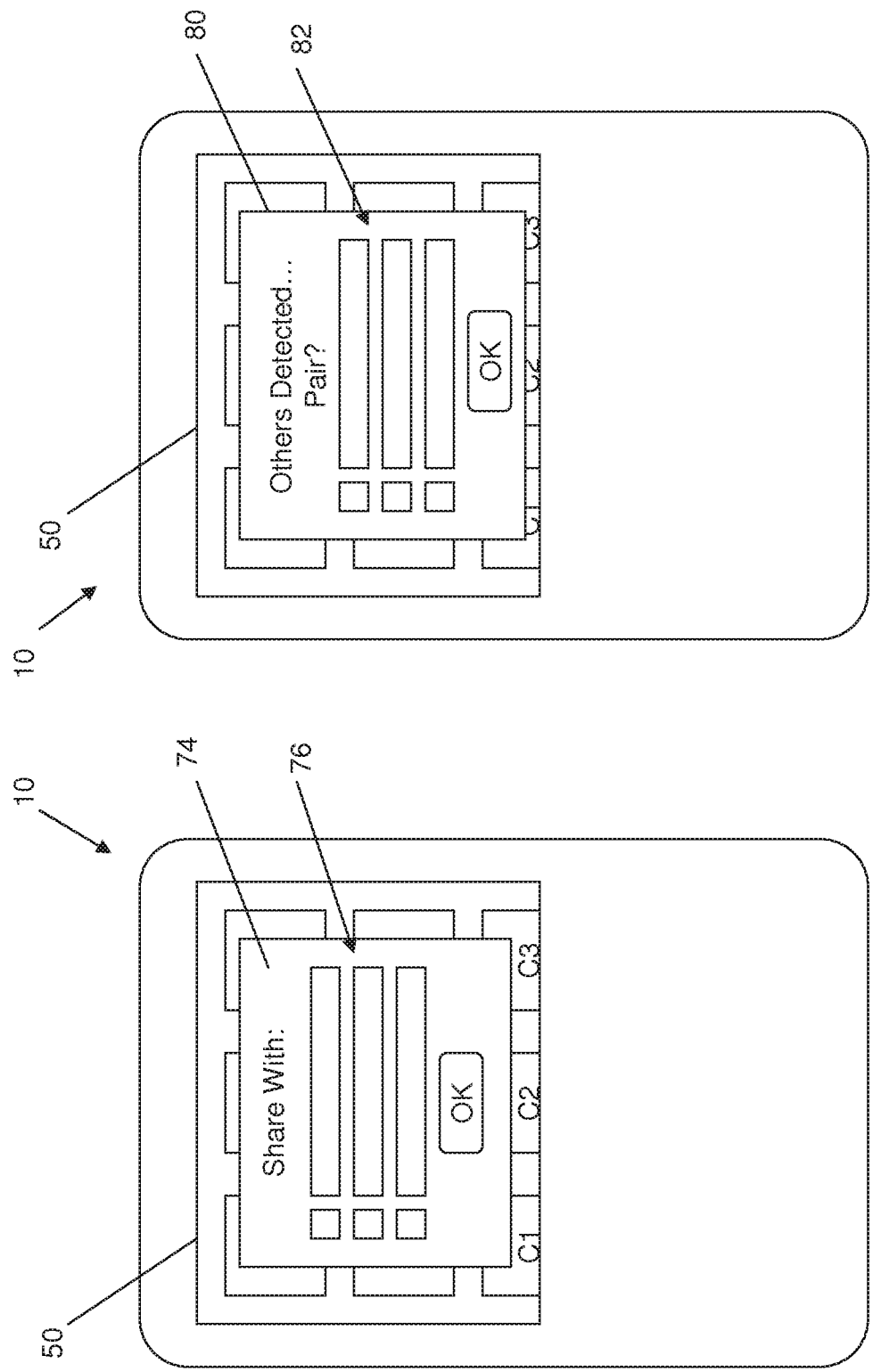
FIG. 17 is a schematic diagram illustrating a prompt displayed for initiating sharing with a list of devices paired with an originating mobile device.
FIG. 18 is a schematic diagram illustrating a prompt displayed for initiating sharing with a list of devices within range of an originating mobile device.

In addition to providing control over when to begin sharing data 12, the data sharing module 28 may also be configured to prompt the user of the mobile device 10 regarding device pairings to provide full control over which devices may participate in the sharing. Such prompting can be particularly advantageous in public locations such as restaurants and coffee shops where some devices that are not necessarily paired or familiar to the mobile device 10 may be within range. Turning now to FIG. 17, a first prompt 74 is shown listing one or more devices that are within range and are known to the mobile device 10. Each listing 76 may be provided with a selection mechanism such as a check box to enable the user to select which of the known pairing should participate in the sharing of data 12. FIG. 18 illustrates a second prompt 80 that may include a listing 82 of other devices that are within range but not known to the mobile device 10. The second prompt 80 may be used to enable the user to allow others to join in the sharing.

It can be appreciated that the mobile device 10 may also be configured to automatically connect only to devices that have been pre-approved and may do so automatically in order to avoid the need to provided prompts such as those shown in FIGS. 17 and 18.

Figure 19:
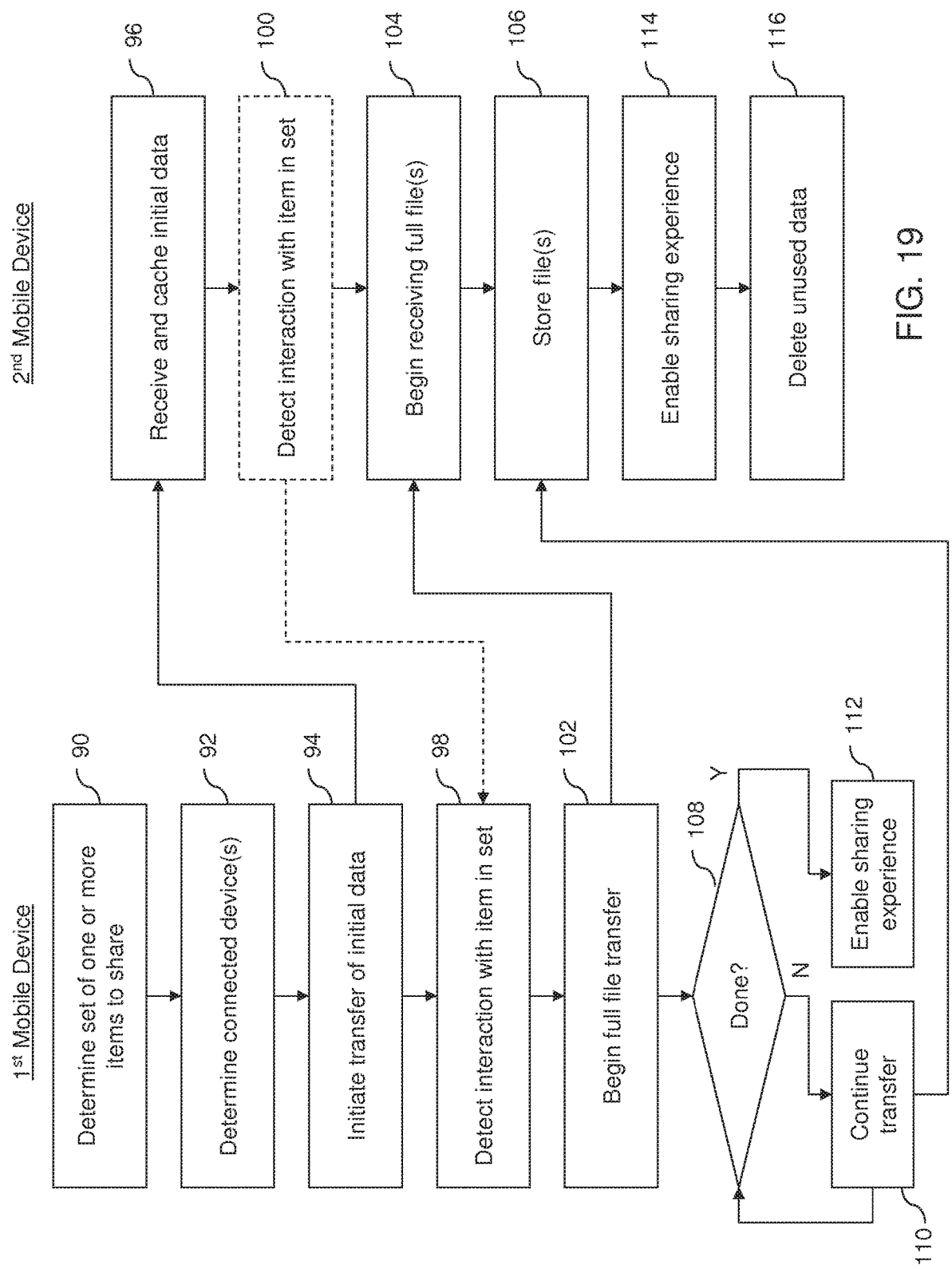
FIG. 19 is a flow chart illustrating example computer executable operations that may be performed in transferring data between first and second mobile devices.

FIG. 19 illustrates an example of a set of computer executable operations that may be performed in a first mobile device 10 sharing a set 52 of data items 54 with a second mobile device 10. At 90, the first mobile device 10 determines the set 52 of one or more items 54 that is to be, or may be shared. As discussed above, determining the set 52 can be performed in various ways, including identifying those items that are currently being displayed or are otherwise visible on the display 50 of the mobile device 10. The first mobile device 10 then determines at 92 any other devices that are or can be connected to the first mobile device 10. In this example, the second mobile device 10 is either currently connected to or paired with the first mobile device 10 (e.g., via Bluetooth) As discussed above, those devices that can be connected to the mobile device 10 may be automatically paired via short term connections (e.g., for regularly paired devices such as tablets, desktop computers, vehicle infotainment or hands-free systems, etc), or such connections may need to be discovered and/or initiated. It can be appreciated that determining which devices can or are connectable to the first mobile device 10 typically varies based on the current environment and which other devices are within range of the first mobile device 10. It can also be appreciated that determining the connected or connectable device(s) at 92 may be done prior to determining the set 52 of items 54 to be shared, or may be done in an entirely separate method that runs independently of that shown in FIG. 19. As such, the example operations shown in FIG. 1999 are purely for the sake of illustration.

In the example shown in FIG. 19, it may be assumed for the sake of illustration that the second mobile device 10 is connectable or connected to the first mobile device 10 via a short-range communication connection 17 and is a willing participant in sharing the set 52 of items 54 identified in 90. At 94, the first mobile device 10 initiates a transfer of initial data to the second mobile device 10. The initial data may include a first portion of complete data files, partial/preview/compressed versions of the data files, etc. For example, if the user of the first mobile device 10 intends on sharing pictures that are currently viewable on the display 50 of the first mobile device 10 in a thumbnail form, data 12 sufficient to enable the same thumbnail images to be viewed on the display 50 of the second mobile device 10 may be sent to the second mobile device 10. The second mobile device 10 receives and caches the initial data to the data sharing cache 30 at 96.

The initial data that is sent by the first mobile device 10 at 94 and cached by the second mobile device 10 at 96 may be provided to begin a full transfer prior to the actual transfer being initiated or otherwise preemptively begin the transfer or sharing process in order to appear seamless. The remaining data or the complete data files may continue to be transferred immediately following the transfer of the initial data or, as illustrated in FIG. 19, may commence after detecting an interaction with one or more items 54 in the set 52. The interaction may be performed or otherwise initiated on or in connection with the first mobile device 10 at 98 or, as shown in dashed lines, may be performed or otherwise initiated on or in connection with the second mobile device 10 at 100. For example, the user of the first mobile device 10 may issue a voice command with respect to one or more of the items 54. Similarly, the user of the first mobile device 10 may directly interact with an item 54, e.g., by dragging the item 54 towards the edge 62 of the display 50 (shown in FIGS. 10 and 11), tap or touch the item 54, gaze at the item 54, etc. Conversely, the user of the second mobile device 10, after viewing the initial data on the display 50 of the second mobile device 10, may attempt to open the file associated with the item 54 or begin enlarging or editing the item 54. After detecting that one or more particular items 54 from the set 52 are being interacted with, the data sharing module 28 of the first mobile device 10 may begin (or continue) the full file transfer associated with at these those one or more items at 102. The second mobile device 10 receives and stores the full file(s) in the data sharing cache 30 at 106.

The data sharing module 28 of the first mobile device 10 may then monitor the data transfer process to determine at 108 whether or not the transfer is complete. If not, the data transfer may continue at 110. Once it is determined at 108 that the data transfer is complete, the data sharing module 28 may continue to enable a sharing experience at 112. It can be appreciated that the sharing experience may include the ability to transfer additional items, the ability to allow others to join the experience, or any other feature or component of the application 26 being used.

After storing the full file(s) in the data sharing cache 30 at 106, the second mobile device 10 may also enable a sharing experience at 114. The sharing experience of the user of the second mobile device 10 may be independent of the user of the first mobile device 10, may be in concert with the experience of the user of the first mobile device 10 (e.g., collaboration, real-time discussion of items 54, etc.), or may be controlled by the user of the first mobile device 10 (e.g., slideshow). The sharing experience may include visual and/or audible confirmation that the data transfer has been completed. Additional feedback may also be provided to make the transfer appear to be faster. For example, a particle effect surrounding the file being transferred can be used. A "landing" movement, sound or other visual cue spanning both screens 50a, 50b such as a ripple effect in the background images of both devices 10a, 10b, can also be used. Changes to the item 54 being shared on one device can also be reflected on the other device to appear as if remote controlled, e.g., playing or pausing a video or slideshow, advancing slides, drawing or editing an image, etc. As such, it can be appreciated that data 12 being shared may also include applications or widgets and the principles discussed herein should not be limited to files.

The data sharing module 28 of the second mobile device 10 may also perform various file management tasks to control the amount of data 12 that is cached, particularly due to the possibility that data 12 may be transferred and not interacted with. Such file storage management may therefore be performed to balance the competing objectives of providing enough data 12 to appear as if the complete data 12 is immediately available on the second mobile device 10 and the bandwidth and storage issues discussed above. In the example shown in FIG. 19, the second mobile device 10 may delete the initial data that is not used or interacted with at 116, e.g., within a predetermined amount of time, after a session ends, or after detecting that the sharing experience has concluded or changed to include a different set 52 of items 54. It can be appreciated that the sharing experience at 112 and 114 may include detection of new or changing sets of items and initiate repeating of the method shown in FIG. 19 to allow ongoing updates to the data 12 available in the data sharing cache 30.

Figure 20:
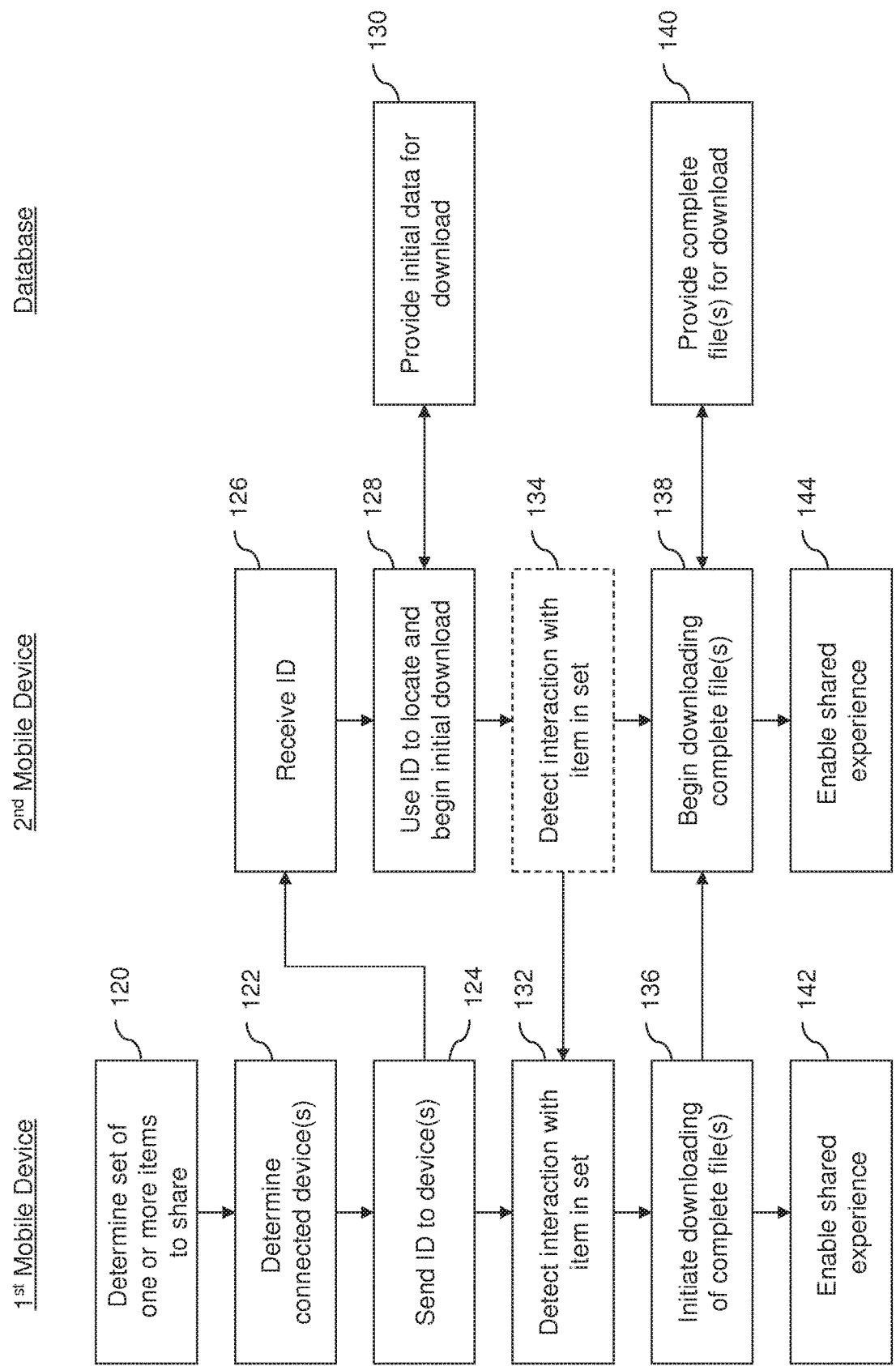
FIG. 20 is a flow chart illustrating example computer executable operations that may be performed in initiating a transfer of data from a network-connected database to a recipient mobile device.

As discussed above, FIG. 1 illustrates that the initiating mobile device 10 may send an ID 14 to other devices to enable those other devices to download or otherwise obtain the data 12 from a remote database 18, e.g., over a wireless network 16. Turning now to FIG. 20, an example set of computer executable operations is shown that may be performed in a first mobile device 10 enabling a second mobile device 10 to obtain data 12 to be shared from a remotely located database 18. Similar to that described above, the first mobile device 10 determines a set 52 of one or more items 54 to be shared at 120, and determines one or more devices that are connected or connectable to the first mobile device 10, in this example, at least the second mobile device 10. At 124, the first mobile device 10 sends an ID 14 to the other devices, including the second mobile device 10 as shown in FIG. 20. The ID 14 contains an identifier, link, or any other suitable information that enables the second mobile device 10 to locate, request or be connected to a source for providing the corresponding data 12. The second mobile device 10 receives the ID 14 at 126 and uses the ID 14 to locate and begin an initial download at 128. It can be appreciated that the initial download initiated at 128 can involve similar data to that provided by the first mobile device 10 in the example shown in FIG. 19, or may be suitably adapted according to the nature of the database 18 providing the initial data for download at 130. Similar to the example of FIG. 19 described above, either the first or second mobile device 10 detects an interaction with an item 54 in the set 52 at 132 or 134 to have the first mobile device initiate a downloading of the complete file(s) at 136 and the second mobile device 10 begin downloading the complete file(s) at 138. It can be appreciated that if the interaction with the item 54 in the set that initiates the complete file download is detected by the second mobile device 10, the second mobile device 10 may begin downloading the complete files at 138 without this operation being initiated by the first mobile device 10 at 136. For example, the user of the second mobile device 10 may begin manipulating an item of interest at 134 and begin the download of the complete file at 138 to avoid delay and report the initiation of the download to the first mobile device 10. The database 18 provides the complete file(s) for download at 140 and the shared experience may then continue between the users of the first and second mobile devices 10 at 142 and 144 respectively.

By enabling other devices to obtain at least some of the data 12 from a remote database 18, the appearance of a seamless transfer can be further quickened. For example, if the second mobile device 10 is connected to a Wi-Fi network, the second mobile device 10 may be capable of downloading the data 12 from a cloud-based database 12 associated with the first mobile device 10 faster than transferring the same data 12 from the first mobile device 10 to the second mobile device 10 over a short-range communications connection 17. As such, the data sharing module 28 may be configured to utilize various communication capabilities and hybrid data sharing methods to achieve the most efficient data transfer available in a current environment.

Figure 21:
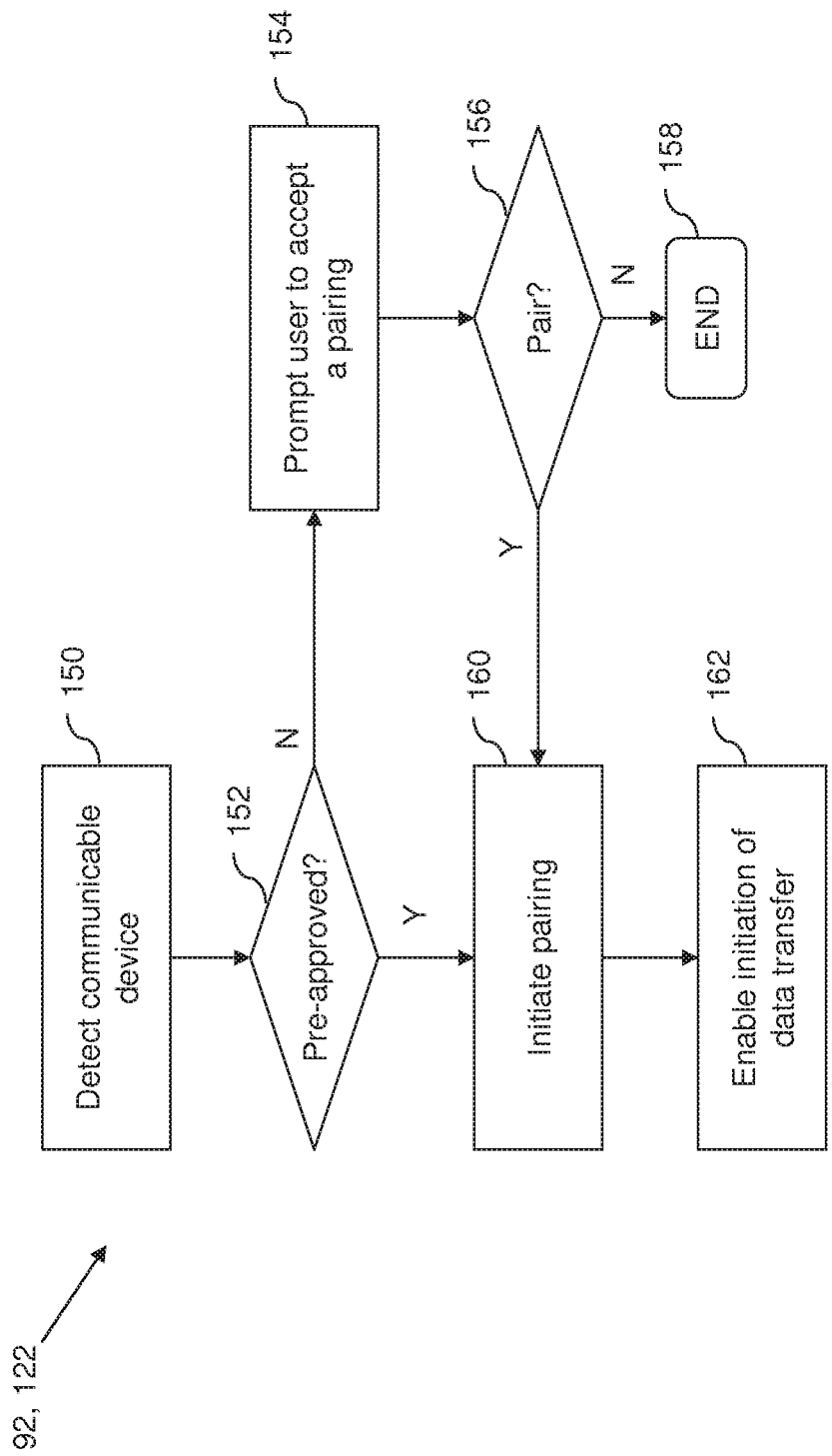
FIG. 21 is a flow chart illustrating example computer executable operations that may be performed in provisioning pairing with other devices for sharing data.

FIG. 21 illustrates an example of a set of computer executable operations that may be performed in connecting other devices to the first mobile device 10, e.g., during operations 92 and 122 shown in FIGS. 19 and 20 respectively. At 150 the data sharing module 28 of the first mobile device 10 detects at least one communicable device and determines at 152 whether or not that/those device(s) is/are pre-approved for communicating with the first mobile device 10. For example, some devices may have been previously paired with the first mobile device 10 and are permitted to automatically connect to the first mobile device 10. If the other device is not pre-approved, the data sharing module 28 may prompt the user to accept a potential pairing with that device at 154, e.g., as shown in FIG. 18. The data sharing module 28 then determines at 156 whether or not the user has accepted the new pairing. If not, the pairing process with respect to that device ends at 158. If the pairing has been accepted, or if the device has been pre-approved, the pairing may be initiated at 160. It can be appreciated that initiation of the pairing may include a further prompt as shown in FIG. 17 to have the user of the first mobile device 10 establish approved devices for a current environment, regardless of whether or not those devices have been pre-approved. After the pairing has been completed, a data transfer may be initiated at 162.

Figure 22:
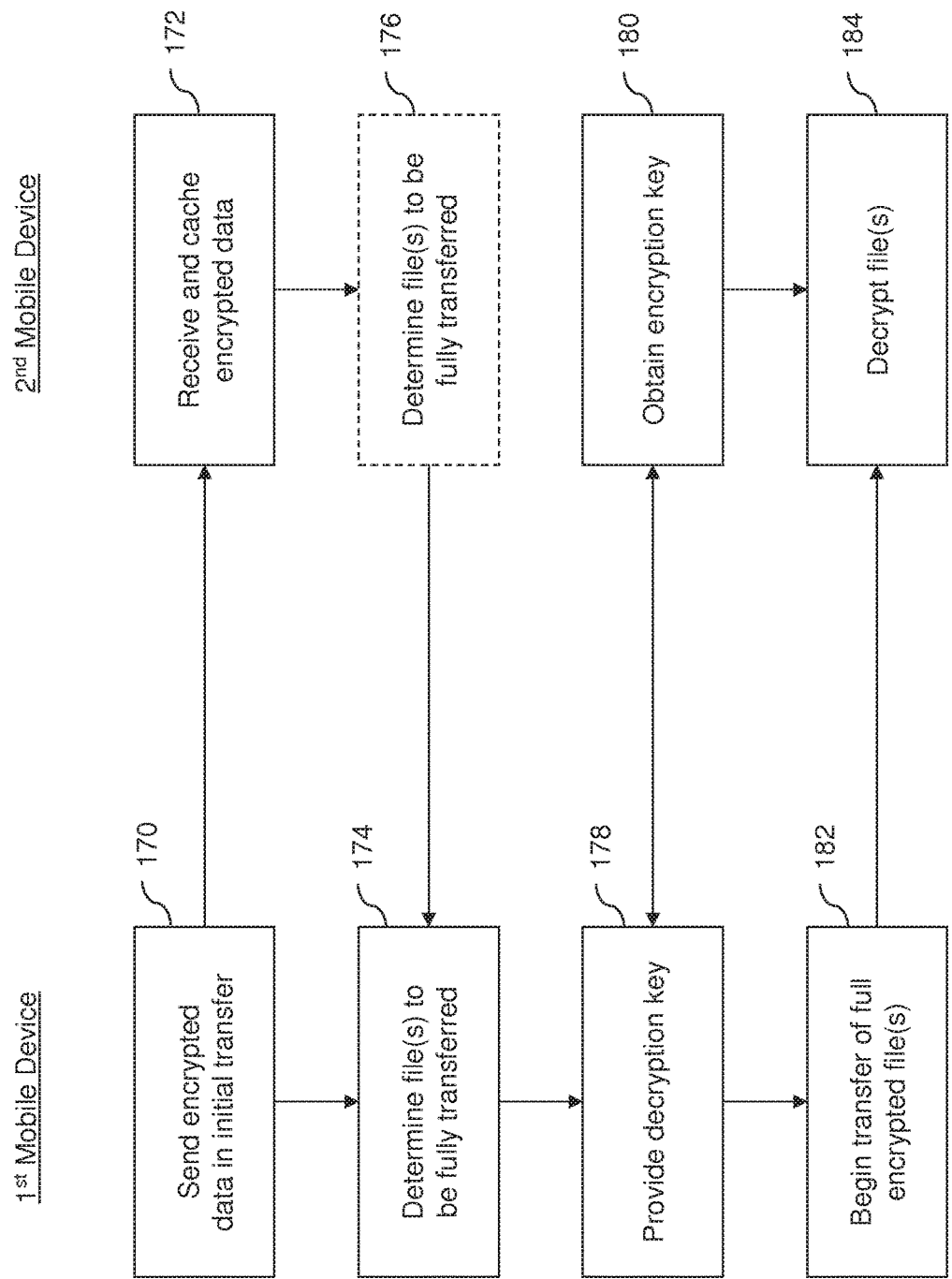
FIG. 22 is a flow chart illustrating example computer executable operations that may be performed in providing a decryption key for decrypting encrypted data shared between first and second mobile devices.

In some examples, the data 12 being shared may be encrypted to prevent unauthorized usage with a decryption key. FIG. 22 illustrates an example of computer executable instructions that may be performed to have a first mobile device 10 share encrypted data with a second mobile device 10. At 170, encrypted data is sent in an initial data transfer, and the encrypted data is received and cached by the second mobile device 10 at 172. At 174 and/or 176, the first and/or second mobile devices 10 determine one or more files that are to be completely transferred. A decryption key may then be sent by the first mobile device 10 at 178 and obtained by the second mobile device at 180. In this way, the second mobile device 10 is unable to utilize the initial data or any additional data transferred at 182 by the first mobile device 10 as it would be encrypted. Once the second mobile device 10 has the decryption key, the data 12 and files transferred by the first mobile device 10 may be decrypted at 184. The decryption key provided by the first mobile device 10 may be ephemeral and may be session based such that the decryption key cannot be stored for later use with additional data sent by the first mobile device 10.

It can be appreciated that the cryptographic process shown in FIG. 22 is for illustrative purposes only. For example, the decryption key may be established using a symmetric key agreement scheme or using public key cryptography.

Figure 23:
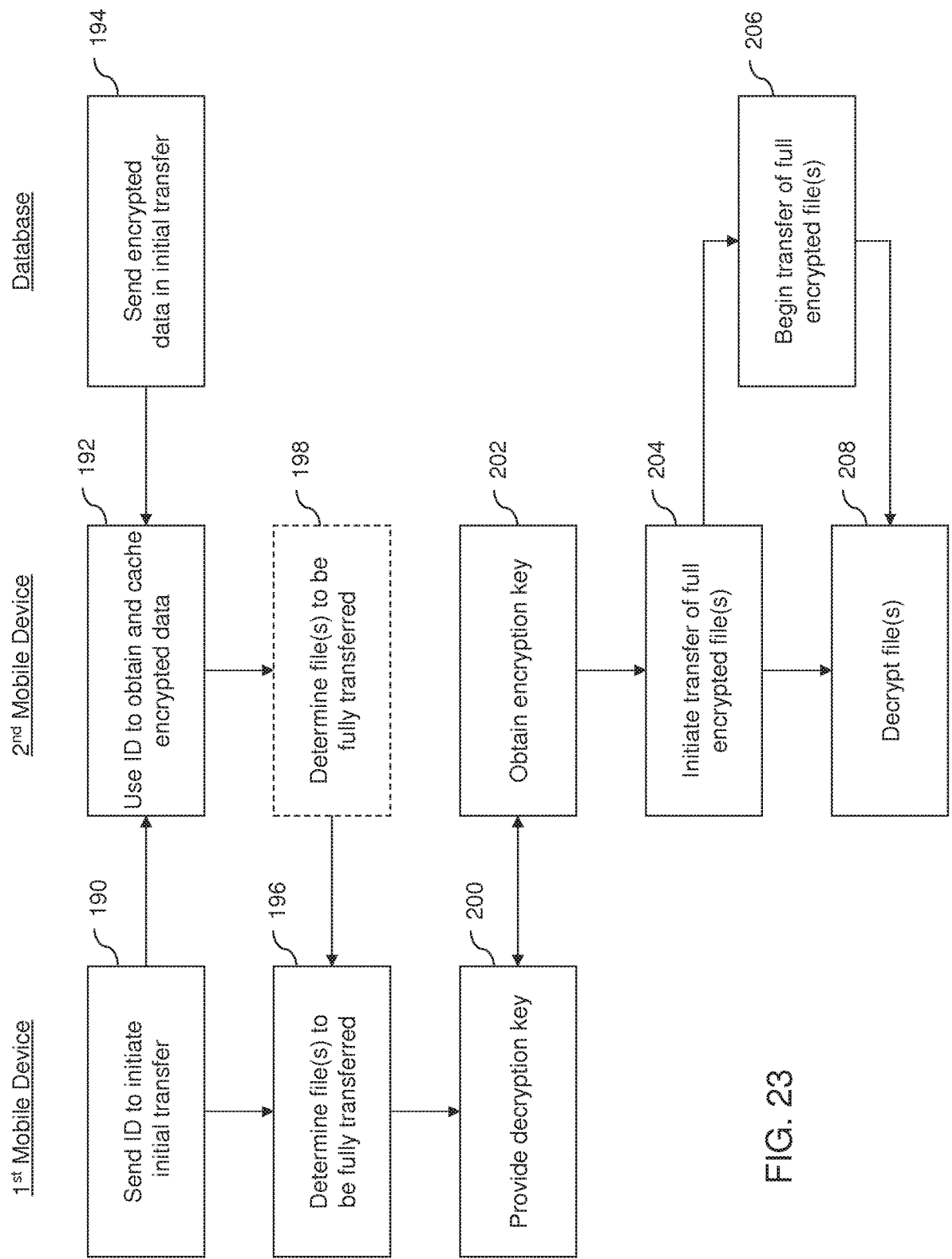
FIG. 23 is a flow chart illustrating example computer executable operations that may be performed in providing a decryption key for decrypting encrypted data shared between first and second mobile devices and obtained by the second mobile device from a remote source.

Turning now to FIG. 23, an example is shown wherein the database 18 stores encrypted files that are to be shared by the first mobile device 10 with the second mobile device 10. It can be appreciated that the database 18 may reside in an enterprise environment or cloud computing service wherein the first mobile device 10 has opted to cryptographically protect the data being shared. At 190 the first mobile device 10 sends the ID 14 to the second mobile device 10 which may be used at 192 to obtain and cache encrypted data provided by the database 18 at 194. Similar to the example shown in FIG. 22, either the first or second mobile device 10 may determine one or more files to be fully transferred to the second mobile device 10 at 196 and/or 198. The first mobile device 10 may then provide at 200, the decryption key that is obtained by the second mobile device 10 at 202. The second mobile device 10, may then initiate the transfer of the full file(s) from the database at 204, which are transferred by the database 18 at 206. The second mobile device 10 may then decrypt the files at 208.

It can be appreciated that in the example shown in FIG. 23, the first mobile device 10 may operate in conjunction with the database 18 to provide data 12 that is encrypted using a session-based key or within a wider public key infrastructure to ensure that the decryption key provided by the first mobile device 10 is capable of decrypting the encrypted data sent to the second mobile device 10 by the database 18. The database 18 may instead be capable of sending the decryption key to the second mobile device 10 upon receiving a request from the first mobile device 10 that is authenticated by the database 18 and/or the first mobile device 10.

Figure 24:
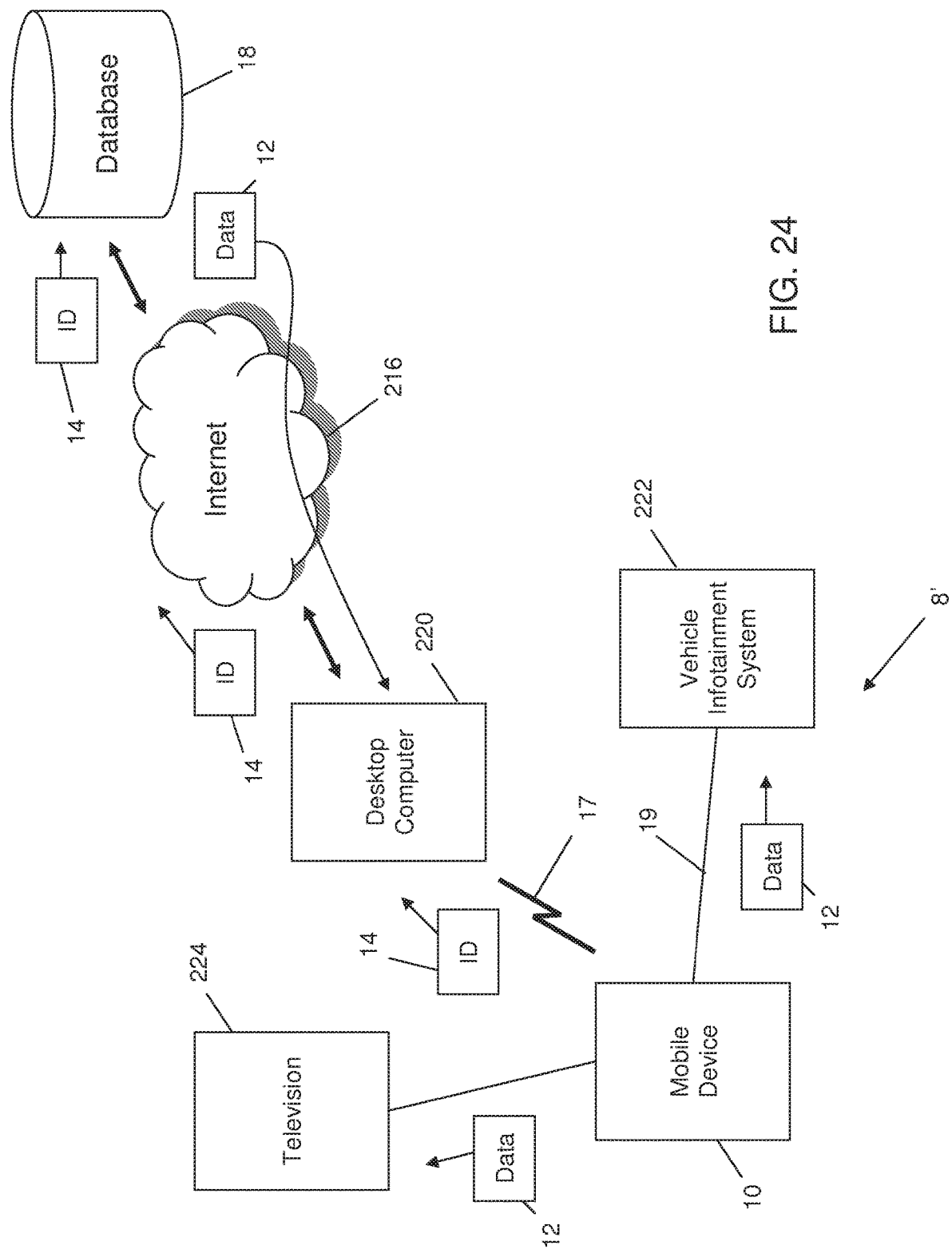
FIG. 24 is a block diagram schematically illustrating a communication system in which at least one device is a non-mobile device.

As discussed above, although the examples herein illustrate the sharing of data 12 between mobile devices 10, the principles discussed herein equally apply to sharing data 12 between a mobile device 10 and other types of devices. FIG. 24 illustrates an example wherein a mobile device 10 provides data 12 or an ID 14 to exemplary devices. In the example shown in FIG. 24, data 12 is sent to a television 224, data 12 is sent to a vehicle infotainment system 222, and an ID 14 is sent to a desktop computer 220 to enable the desktop computer to access the internet 216 to obtain the data 12 from a database 18. As such, it can be appreciated that data 12 stored and/or captured or generated on the mobile device 12 can be seamlessly shared using other devices in a manner similar to the examples described above. For example, photos captured by the mobile device 10 may be shared with other users on a television 224. Similarly, items captured or generated by the mobile device 10 can be transferred to the desktop computer to facilitate the generation of a presentation or other document. The mobile device 10 may also be capable of sharing, for example, audio files, with an in-vehicle infotainment system 222 to enable only those audio files selected by the user to be fully transferred to the vehicle thus reducing the amount of data required to be stored in the vehicle infotainment system 222. As discussed above, camera and proximity sensors may also be incorporated or otherwise relied upon for determining which items 54 to transfer in advance to other devices.

It can be appreciated that the examples shown in FIG. 24 are for illustrative purposes only and equally apply to any other device capable of communicating with the mobile device 10 and/or the database 18.

Accordingly, there may be provided a method of transferring data from a first mobile device to another device, the method comprising: identifying a set comprising one or more items; initiating a first transfer of at least some data associated with at least one of the one or more items to the another device; detecting an interaction with the set; and enabling a second transfer of additional data associated with the set.

There is also provided a computer readable storage medium comprising computer executable instructions for transferring data from a first mobile device to another device, the computer executable instructions comprising instructions for: identifying a set comprising one or more items; initiating a first transfer of at least some data associated with at least one of the one or more items to the another device; detecting an interaction with the set; and enabling a second transfer of additional data associated with the set.

There is also provided an electronic device comprising a processor, memory, and a display, the memory comprising computer executable instructions for transferring data from the electronic device to another device, the computer executable instructions comprising instructions for: identifying a set comprising one or more items; initiating a first transfer of at least some data associated with at least one of the one or more items to the another device; detecting an interaction with the set; and enabling a second transfer of additional data associated with the set.

Figure 25:
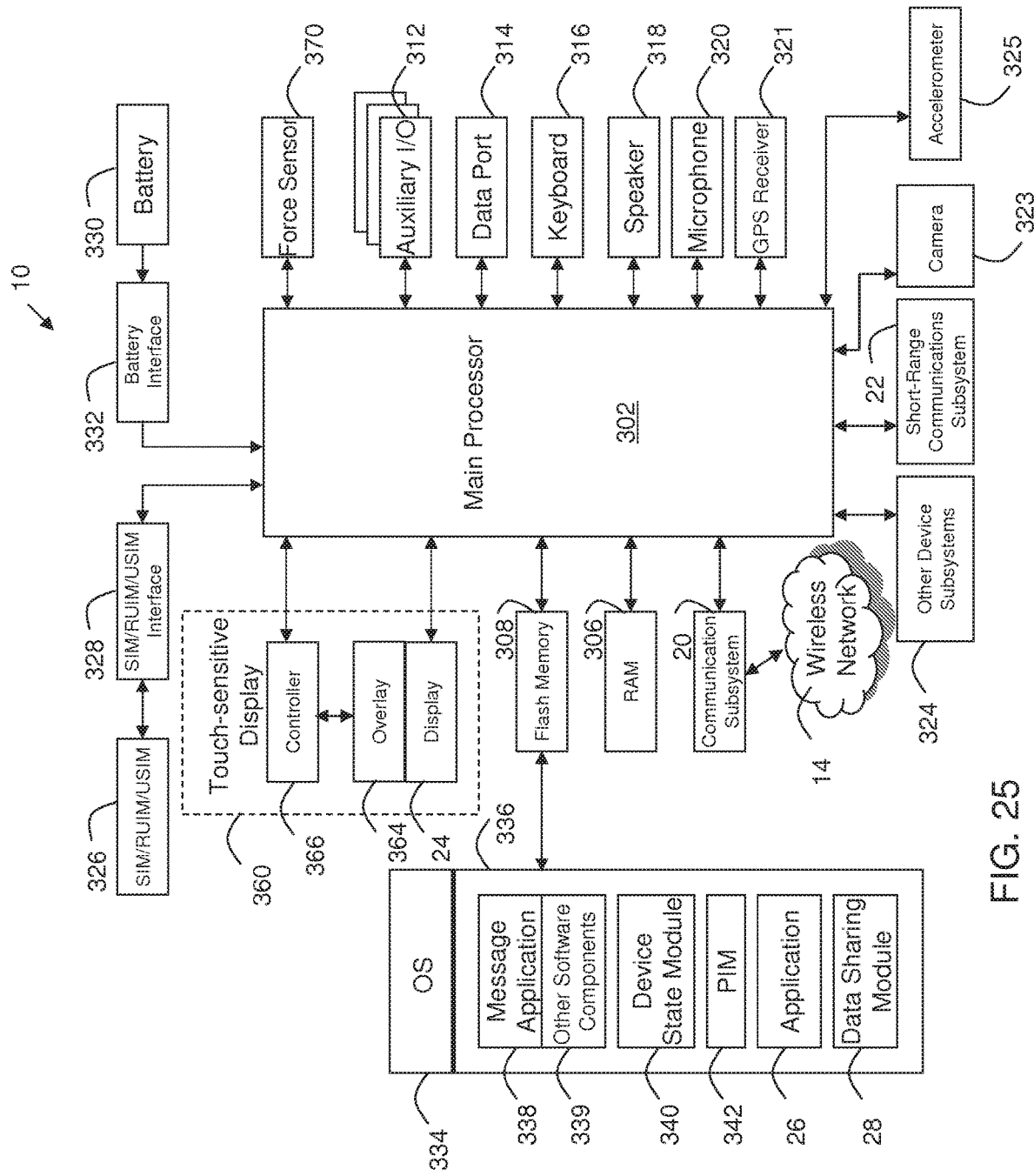
FIG. 25 is a block diagram schematically illustrating a configuration for a mobile device.

Referring to FIG. 25, to further aid in the understanding of the example mobile devices 10 described above, shown therein is a block diagram of an example configuration of a mobile device 10. The mobile device 10 includes a number of components such as a main processor 302 that controls the overall operation of the mobile device 10. Communication functions, including data and voice communications, are performed through a communication subsystem 20. The communication subsystem 20 receives messages from and sends messages to a wireless network 16. In this example of the mobile device 10, the communication subsystem 20 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication subsystem 20 with the wireless network 16 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 24, an auxiliary input/output (I/O) subsystem 312, a data port 314, a keyboard 316 (physical, virtual, or both), a speaker 318, a microphone 320, a GPS receiver 321, short-range communications subsystem 22, a camera 323, a accelerometer 325 and other device subsystems 324. Some of the subsystems of the mobile device 10 perform communication-related functions, whereas other subsystems may provide "resident" or on-device functions. By way of example, the display 24 and the keyboard 316 may be used for both communication-related functions, such as entering a text message for transmission over the wireless network 16, and device-resident functions such as a calculator or task list. In one example, the mobile device 10 can include a non touch-sensitive display in place of, or in addition to the touch-sensitive display 24. For example the touch-sensitive display 24 can be replaced by a display 62 that may not have touch-sensitive capabilities.

The mobile device 10 can send and receive communication signals over the wireless network 16 after required network registration or activation procedures have been completed. Network access is associated with a subscriber or user of the mobile device 10. To identify a subscriber, the mobile device 10 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 26, and 28. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 26, and 28, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, an application 26 (see also FIG. 3), and a data sharing module 38 (see also FIG. 3). A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 16.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 16, the auxiliary I/O subsystem 312, the data port 314, the short-range communications subsystem 22, or any other suitable device subsystem 324.

The data port 314 can be any suitable port that enables data communication between the mobile device 10 and another computing device. The data port 314 can be a serial or a parallel port. In some instances, the data port 314 can be a USB port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 24 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 24 of the touch-sensitive display 360 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. The controller 366 and/or the processor 302 may detect a touch by any suitable contact member on the touch-sensitive display 360. Similarly, multiple simultaneous touches, are detected.

One or more gestures are also detected by the touch-sensitive display 360. A gesture is a particular type of touch on a touch-sensitive display 360 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An example of a gesture is a swipe (also known as a "flick"). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the communication system 8 or other devices 220, 222, 224, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of sharing data, the method comprising:
    identifying, by an electronic device, at least one item on the electronic device that is likely to be shared with at least one other electronic device, wherein the at least one item is identified without receiving a request for the at least one item from the at least one other electronic device;
    sending, by the electronic device, an identifier to the at least one other electronic device, the identifier enabling the at least one other electronic device to obtain the at least one item via a wireless network; and
    enabling, by the electronic device, transfer of the at least one item to the at least one other electronic device after an interaction with the identifier at one or more of the electronic device or the at least one other electronic device.

2. The method of claim 1, wherein the identifier comprises a link.

3. The method of claim 1, wherein the identifier enables the at least one other electronic device to obtain the at least one item via a web-based system or service.

4. The method of claim 1, wherein the identifier enables the at least one other electronic device to obtain the at least one item via a cloud-based service.

5. The method of claim 1, wherein the identifying is based on at least one criterion.

6. The method of claim 1, wherein the identifying is based on a predictive technique.

7. The method of claim 1, wherein the identifying is based on a relationship of a user of the electronic device.

8. The method of claim 7, wherein the relationship comprises a family relationship.

9. The method of claim 7, wherein the relationship comprises a friendship.

10. The method of claim 7, wherein the relationship comprises a business relationship.

11. The method of claim 1, wherein the electronic device comprises a mobile device.

12. The method of claim 1, wherein the at least one other electronic device comprises a mobile device.

13. An electronic device comprising:
    a memory; and
    at least one processor configured to:
    identify at least one item on the electronic device that is likely to be shared with at least one other electronic device, wherein the at least one item is identified without receiving a request for the at least one item from the at least one other electronic device;
    send an identifier to the at least one other electronic device, wherein the identifier enables the at least one other electronic device to obtain the at least one item via a wireless network; and
    enable transfer of the at least one item to the at least one other electronic device after an interaction with the identifier at one or more of the electronic device or the at least one other electronic device.

14. The electronic device of claim 13, wherein the identifier comprises a link.

15. The electronic device of claim 13, wherein the identifier enables the at least one other electronic device to obtain the at least one item via a web-based system or service.

16. The electronic device of claim 13, wherein the identifier enables the at least one other electronic device to obtain the at least one item via a cloud-based service.

17. The electronic device of claim 13, wherein the at least one processor is configured to identify the at least one item based on at least one criterion.

18. The electronic device of claim 13, wherein the at least one processor is configured to identify the at least one item based on a predictive technique.

19. The electronic device of claim 13, wherein the at least one processor is configured to identify the at least one item based on a relationship of a user of the electronic device.

20. The electronic device of claim 19, wherein the relationship comprises a family relationship.

21. The electronic device of claim 19, wherein the relationship comprises a friendship.

22. The electronic device of claim 19, wherein the relationship comprises a business relationship.

23. The electronic device of claim 13, wherein the electronic device comprises a mobile device.

24. The electronic device of claim 13, wherein the at least one other electronic device comprises a mobile device.

25. A non-transitory computer readable storage medium comprising computer executable instructions, which when executed, cause an electronic device to perform operations comprising:
    identifying at least one item on an electronic device that is likely to be shared with at least one other electronic device, wherein the at least one item is identified without receiving a request for the at least one item from the at least one other electronic device;
    sending an identifier to the at least one other electronic device, the identifier enabling the at least one other electronic device to obtain the at least one item via a wireless network; and
    enabling transfer of the at least one item to the at least one other electronic device after an interaction with the identifier at one or more of the electronic device or the at least one other electronic device.

26. The non-transitory computer readable storage medium of claim 25, wherein the identifier comprises a link.

27. The non-transitory computer readable storage medium of claim 25, wherein the identifier enables the at least one other electronic device to obtain the at least one item via a web-based system or service.

28. The non-transitory computer readable storage medium of claim 25, wherein the identifier enables the at least one other electronic device to obtain the at least one item via a cloud-based service.

29. The non-transitory computer readable storage medium of claim 25, wherein the identifying is based on at least one criterion.

30. The non-transitory computer readable storage medium of claim 25, wherein the identifying is based on a predictive technique.

31. The non-transitory computer readable storage medium of claim 25, wherein the identifying is based on a relationship of a user of the electronic device.

32. The non-transitory computer readable storage medium of claim 31, wherein the relationship comprises a family relationship.

33. The non-transitory computer readable storage medium of claim 31, wherein the relationship comprises a friendship.

34. The non-transitory computer readable storage medium of claim 31, wherein the relationship comprises a business relationship.

35. The non-transitory computer readable storage medium of claim 25, wherein the electronic device comprises a mobile device.

36. The non-transitory computer readable storage medium of claim 25, wherein the at least one other electronic device comprises a mobile device.

* * * * *